US012779416B2

(12) United States Patent
Stieneker et al.

(10) Patent No.: US 12,779,416 B2
(45) Date of Patent: Nov. 3, 2026

(54) CASSETTE SYSTEM FOR ASEPTIC MIXING PROCESS

(71) Applicant: leon-nanodrugs GmbH, Planegg (DE)

(72) Inventors: Frank Stieneker, Plannegg (DE); Martin Erhard, Planegg (DE); Charlie Lowndes, Ickleton (GB); Oliver Harvey, Ickleton (GB); Joseph Conroy, Ickleton (GB); John Burke, Ickleton (GB)

(73) Assignee: Ieon-nanodrugs GmbH, Planegg (DE)

( * ) Notice: Subject to any disclaimer, the term of this patent is extended or adjusted under 35 U.S.C. 154(b) by 43 days.

(21) Appl. No.: 18/878,300

(22) PCT Filed: Oct. 2, 2023

(86) PCT No.: PCT/EP2023/077266
§ 371 (c)(1),
(2) Date: Dec. 23, 2024

(87) PCT Pub. No.: WO2024/069012
PCT Pub. Date: Apr. 4, 2024

(65) Prior Publication Data
US 2026/0001052 A1 Jan. 1, 2026

(30) Foreign Application Priority Data

Sep. 30, 2022 (EP) .................................... 22199253
Jul. 25, 2023 (EP) .................................... 23187456

(51) Int. Cl.
*B01F 35/52* (2022.01)
*B01F 25/40* (2022.01)
(Continued)

(52) U.S. Cl.
CPC .............. *B01F 35/52* (2022.01); *B01F 25/40* (2022.01); *B01F 35/43* (2022.01); *B01F 35/513* (2022.01);
(Continued)

(58) Field of Classification Search
CPC ........ B01F 35/52; B01F 35/43; B01F 35/513; B01F 35/713; B01F 33/50112; B01F 2101/22
See application file for complete search history.

(56) References Cited

U.S. PATENT DOCUMENTS 902,858 A 11/1908 Cooke et al.
1,806,801 A 5/1931 Higgins et al.
(Continued)

FOREIGN PATENT DOCUMENTS

CN 108325493 A 7/2018
DE 102016213000 A1 1/2018
(Continued)

OTHER PUBLICATIONS

Extended European Search Report issued in EP21206216.0, Apr. 28, 2022, 9 pages.
(Continued)

*Primary Examiner* — Marc C Howell
(74) *Attorney, Agent, or Firm* — Synergy IP Group AG; Lily Ackerman

(57) ABSTRACT

A frame for holding and arranging a static mixing device along with flexible containers for liquid substrates, waste, and a liquid product. The frame includes sealable regions for holding the containers and the flexible containers and the mixing device. Other aspects relate to kits including the frame together with one or more matching components, such as the static mixing device and the flexible containers; as
(Continued)

well as apparatus for operating the frame in its assembled state, and methods including the use of the frame.

16 Claims, 19 Drawing Sheets

(51) Int. Cl.
*B01F 35/43* (2022.01)
*B01F 35/513* (2022.01)
*B01F 35/30* (2022.01)
*B01F 101/22* (2022.01)

(52) U.S. Cl.
CPC ..... *B01F 2035/351* (2022.01); *B01F 2101/22* (2022.01)

(56) References Cited

U.S. PATENT DOCUMENTS

| | | | | |
|---|---|---|---|---|
| 3,306,587 | A | 2/1967 | Schroedter | |
| 5,061,446 | A * | 10/1991 | Guigan | G01N 33/5302 422/547 |
| 5,186,905 | A | 2/1993 | Bertram et al. | |
| 5,318,702 | A | 6/1994 | Ashbrook | |
| 7,563,019 | B2 | 7/2009 | Buchholz | |
| 7,784,997 | B2 | 8/2010 | Neumann | |
| 11,298,673 | B2 | 4/2022 | Walter et al. | |
| 11,745,388 | B2 | 9/2023 | Lautt | |
| 2006/0109738 | A1 | 5/2006 | Buchholz | |
| 2006/0166233 | A1 | 7/2006 | Wu et al. | |
| 2009/0269250 | A1 | 10/2009 | Panagiotou et al. | |
| 2013/0221141 | A1 | 8/2013 | Zhang et al. | |
| 2014/0044847 | A1 | 2/2014 | Hellmaier | |
| 2016/0187764 | A1 | 6/2016 | Tobita | |
| 2017/0361299 | A1 | 12/2017 | Brunelli et al. | |
| 2018/0237285 | A1 | 8/2018 | Tom et al. | |
| 2020/0156038 | A1 | 5/2020 | Walter et al. | |
| 2021/0122085 | A1 | 4/2021 | Lautt | |
| 2022/0118414 | A1 | 4/2022 | Zhu et al. | |
| 2022/0143280 | A1* | 5/2022 | Ageishi | A61M 1/3693 |
| 2022/0143620 | A1* | 5/2022 | West | A61M 1/0277 |
| 2023/0219044 | A1 | 7/2023 | Mittal et al. | |
| 2024/0269644 | A1 | 8/2024 | Stieneker | |
| 2025/0381532 | A1 | 12/2025 | Erhard et al. | |
| 2025/0381549 | A1 | 12/2025 | Stieneker et al. | |
| 2026/0151746 | A1 | 6/2026 | Stieneker | |

FOREIGN PATENT DOCUMENTS

| | | | |
|---|---|---|---|
| EP | 1165224 | B1 | 9/2002 |
| EP | 1146959 | B1 | 6/2008 |
| EP | 2133149 | A1 | 12/2009 |
| EP | 3939630 | A1 | 1/2022 |
| EP | 21192535.9 | | 3/2023 |
| WO | 9110615 | A1 | 7/1991 |
| WO | 2006005401 | A2 | 1/2006 |
| WO | 2009076276 | A2 | 6/2009 |
| WO | 2010008396 | A2 | 1/2010 |
| WO | 2018065109 | A1 | 4/2018 |
| WO | 2018234217 | A1 | 12/2018 |
| WO | 2019246615 | A1 | 12/2019 |
| WO | 2021035831 | A1 | 3/2021 |
| WO | 2021252715 | A1 | 12/2021 |
| WO | 2023025736 | A1 | 3/2023 |
| WO | 2023079039 | A1 | 5/2023 |
| WO | 2024069012 | A1 | 4/2024 |
| WO | 2024069014 | A1 | 4/2024 |

OTHER PUBLICATIONS

International Search Report and Written Opinion issued in PCT/EP2023/075054, Dec. 19, 2023, 16 pages.
International Search Report and Written Opinion issued in PCT/EP2022/080743, Feb. 21, 2023, 20 pages.
International Search Report and Written Opinion issued in PCT/EP2023/077266, Feb. 5, 2024, 18 pages.
International Search Report and Written Opinion issued in PCT/EP2023/077273, Feb. 7, 2024, 18 pages.
Extended European Search Report issued in EP22195145.2, Mar. 2, 2023, 10 pages.
Extended European Search Report issued in EP22199253.0, Mar. 31, 2023, 10 pages.
International Search Report and Written Opinion of International Application PCT/EP2022/073361, Nov. 30, 2022, 22 pages.

* cited by examiner

CASSETTE SYSTEM FOR ASEPTIC MIXING PROCESS

CROSS-REFERENCE TO RELATED APPLICATIONS

This application is a national stage entry according to 35 U.S.C. § 371 of PCT Application No. PCT/EP2023/077266 filed on Oct. 2, 2023, which claims priority to EP 22199253.0 filed on Sep. 30, 2022, and EP 23187456.1 filed on Jul. 25, 2023, which are entirely incorporated herein by reference.

BACKGROUND

Process automation as well as up- and downscaling of mixing processes are tasks regularly dealt with in various fields of biotechnology and medicine.

Systems for the production of mixed fluids or products based on combination of two or more components need a source of liquid raw material, supply lines, a chamber in which the mixing or reaction takes place and an outlet for harvesting the product. The chamber often represents the heart of such systems and can for example be bulky, like e.g. containers, or miniaturized, like in microfluidic approaches. However, setup of the system, conditions and the quality of the raw material also plays a decisive role in these processes.

One example of a discontinuous mixing system is the apparatus for mixing, storing and homogenizing liquids as discussed in U.S. Pat. No. 7,784,997B2. It includes a rigid container fitted with a non-invasive pump. The container encloses a single-use bag that has an orifice at the lower face used as an outlet for the liquid and further orifices on the top of the bag for the addition of various liquids in order to produce a mixture. One of the upper orifices is used for the liquid to return to the inside of the bag (with help of the pump) enabling a closed-circuit circulation. The system is intended for single-use and prevents the cleaning and sterilization steps that are necessary when rigid tanks are used for the mixing. It is able to handle bags with a volume of 25 to 3000 l but is does not appear to be suitable for the production of small amount, like e.g. μl- or ml amounts.

EP1146959B1 discusses an apparatus for the continuous production of encapsulated therapeutic compounds that gives an example for a precisely controlled metering system. The apparatus includes a lipid phase storage means and an aqueous phase storage means, a pressurized transfer means for transferring the phases to a mixing device that may be a static mixer. The apparatus of EP1146959B1 additionally includes a pre-mixing system. The phases are transported from the means to the pre-mixing and mixing chamber with help of metering pumps driven by a motor. Since this system is a continuous system, it is able to produce higher amounts of the desired product.

Despite these and other solutions to mixing systems and methods, the need for methods, devices and apparatuses for the production of small quantities of products which are fast, reliable and can be performed under standardized conditions is not fully met. This is especially true for applications in the field of personalized medicine.

It is thus an object of the present disclosure to provide means, apparatuses, components and methods for the production of mixed fluids or products based on combination of two or more components that are flexible in terms of adaptation to different kind of products as well as robust, fast and reliably producing the desired product. They also aim at providing a high-throughput approach. Further objects of the disclosure will be clear on the basis of the following description, the drawings and the claims.

SUMMARY

In a first aspect, the disclosure relates to a frame adapted for holding simultaneously (a) a first and a second flexible substrate container each including an outlet port, (b) a flexible waste container including an inlet port, (c) a flexible product container including an inlet port, (d) a static mixing device including at least a first and a second inlet port and an outlet port, and (e) conduits for fluidically connecting the outlet port of the first substrate container with the first inlet port of the static mixing device, the outlet port of the second substrate container with the second inlet port of the static mixing device, and the outlet port of the static mixing device with the inlet ports of the waste container and the product container. The frame is further characterized in that it includes a first sealable region for holding the first flexible substrate container, a second sealable region for holding the second flexible substrate container, and a means for holding the static mixing device. Moreover, the frame has an operating orientation, and the first and the second sealable region and the means for holding the static mixing device are arranged such that a flow of fluid from the first and the second substrate container to the static mixing device and/or from the static mixing device to the waste or product container in the operating orientation occurs at least partially in an anti-gravity direction. The frame is particularly useful for aseptic small batch production of sterile liquid products that require the mixing of two fluid substrates, in particular without the use of pumps.

In a further aspect, the disclosure provides a kit including the frame as described herein and any one of the following components: (a) the first and/or the second flexible substrate container; (b) the flexible waste container; (c) the flexible product container; (d) the static mixing device; and/or (e) one or more conduits for fluidically connecting the outlet port of the first substrate container with the first inlet port of the static mixing device, the outlet port of the second substrate container with the second inlet port of the static mixing device, and the outlet port of the static mixing device with the inlet ports of the flexible waste container and the flexible product container. The kit may also include the frame and all of the components (a) to (e), including both the first and the second flexible substrate container and all the conduits for the specified fluid connections. Alternatively, the kit may include the components (a) to (e), but not the frame.

According to a further aspect of the disclosure, a flexible container is provided which is adapted for use as a flexible substrate container, a flexible waste container or a flexible product container as specified herein-above. The container has an internal space for holding a fluid material which is surrounded by a flexible front wall and a flexible back wall, each wall being made of a polymeric material. Moreover, the container further includes at least one inlet or outlet port for enabling fluid communication with the internal space. The flexible front wall and the flexible back wall are connected to one another such as to form a sealed edge which substantially surrounds the internal space. The edge includes four corner regions such that the internal space when empty has a square or rectangular overall shape. The container is further characterized in that at least two through-holes are provided in the sealed edge, of which a first through-hole is provided in or near a first corner region and a second through-hole is provided in or near a second corner region of the edge, and the second corner region is adjacent to the first corner region. Yet further aspects of the disclosure relate to apparatus for aseptically filling the first and second flexible substrate container assembled in the frame, apparatus for mixing a first and a second liquid substrate wherein the liquid substrates are contained in the first and the second flexible substrate container, which containers are assembled in the frame, as well as methods for mixing a first and a second liquid substrate, said methods relying on the use of the frame in which the first and the second flexible substrate container are assembled.

Further aspects, features and non-limiting embodiments are described in more detail below.

DETAILED DESCRIPTION

Figure 1:
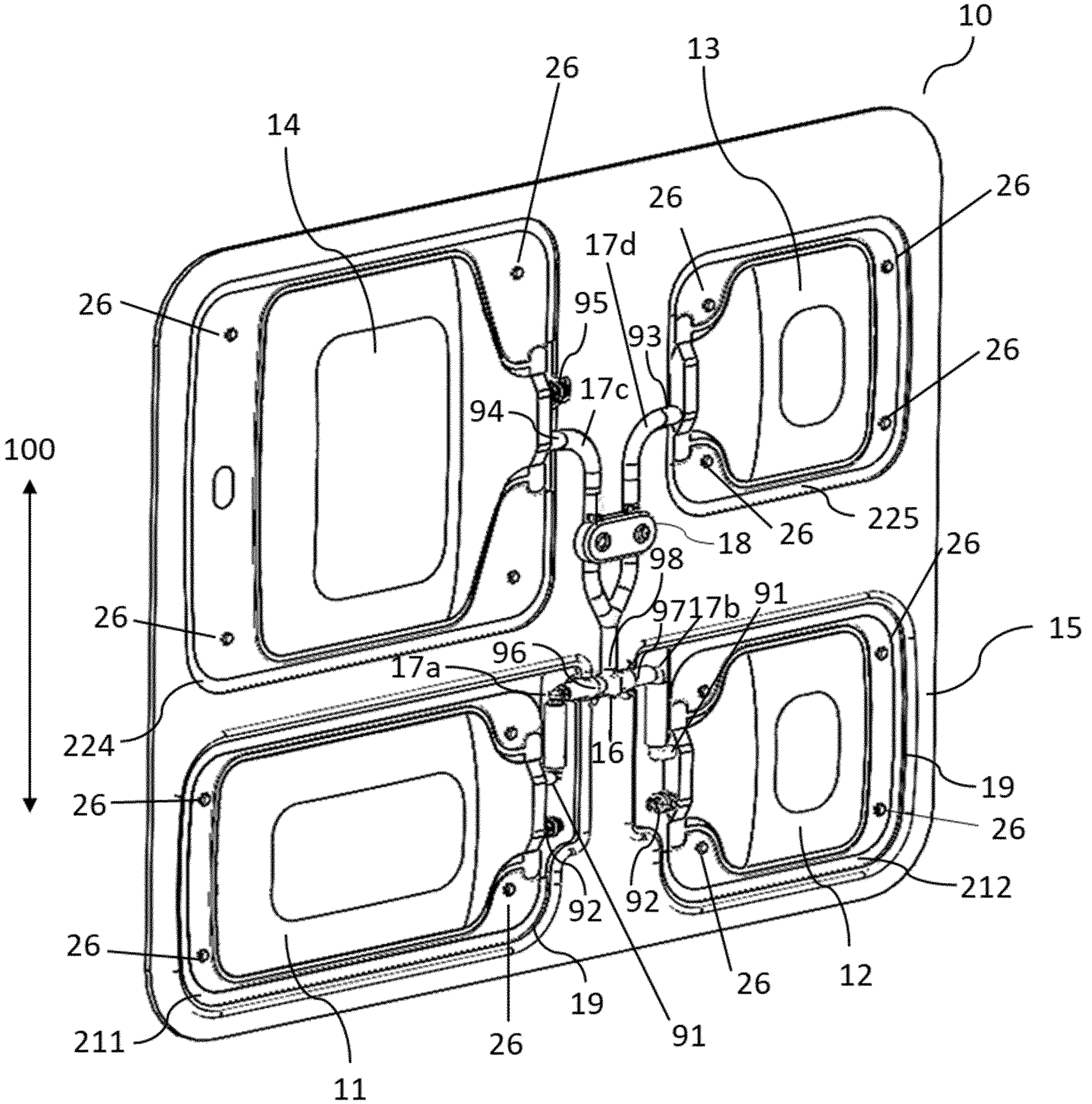
FIG. 1 depicts a perspective view of a frame (10).

In one aspect, the present disclosure provides a frame adapted for holding simultaneously (a) a first and a second flexible substrate container each including an outlet port, (b) a flexible waste container including an inlet port, (c) a flexible product container including an inlet port, (d) a static mixing device including at least a first and a second inlet port and an outlet port, and (e) conduits for fluidically connecting the outlet port of the first substrate container with the first inlet port of the static mixing device, the outlet port of the second substrate container with the second inlet port of the static mixing device, and the outlet port of the static mixing device with the inlet ports of the waste container and the product container. The frame is further characterized in that it includes a first sealable region for holding the first flexible substrate container, a second sealable region for holding the second flexible substrate container, and a means for holding the static mixing device. Moreover, the frame has an operating orientation, and the first and the second sealable region and the means for holding the static mixing device are arranged such that a flow of fluid from the first and the second flexible substrate container to the static mixing device and/or from the static mixing device to the waste or product container in the operating orientation occurs at least partially in an anti-gravity direction.

Such frame is particularly useful for aseptically mixing or reacting two fluid substrates in small batches such as to obtain a sterile liquid product, such as a liquid pharmaceutical product. For example, the mixing or reacting of the two substrates may be driven by the use of pressure, such as a pressurized gas, and allows processes in which all substrate- or product-contacting parts can be provided as sterile disposables. Moreover, the frame may be used to minimize dead volumes that would lead to low product yield, in particular with very small batches, such as in personalized medicine manufacture. The at least partial anti-gravity flow of fluid effected by the frame reduces negative effects of gas that may be present in the substrate containers or generated during the mixing process, such as bubble formation. These and further unexpected effects and advantages will be described in further detail below.

As used herein, a frame should be understood as a supporting structure or holder for the specified components, providing their spatial arrangement. In this context, the skilled person will understand that the expression "for" as in "for holding" implies that the frame is arranged or adapted for the specified purpose.

The flexible substrate containers, herein sometimes also simply referred to as substrate containers, are containers that are adapted to hold fluid substrates, in particular liquid substrates, such as sterile liquids that are intermediate products in the preparation of injectable medicines. They may exhibit a high degree of flexibility, similar to infusion bags. Each substrate container includes at least one outlet port which is fluidically connectable to the static mixing device via a conduit.

Similarly, the waste container and the product container are adapted for holding fluid waste or fluid product, respectively, and they also exhibit flexibility. Each of these containers has at least one inlet port that is fluidically connectable to the static mixing device e.g. via a conduit, so that the container can receive waste or product from the mixing device. Also the product and at least some of the waste are typically liquids. In an alternative non-limiting embodiment, the waste container and/or the product container is non-flexible, whereas the substrate containers are flexible.

With respect to the conduits, it should be understood that these may have any structure that enables them to conduct a fluid material, such as a tubular or pipe-like structure. At the same time, the conduits should not be understood to require a specific minimum length. In fact, according to some non-limiting embodiments, the length of a conduit may be very small, even relative to its external diameter, which would minimize the internal volume and thus potentially the dead space associated with the conduit.

The frame may be adapted to hold any type of static mixing device. As used herein, a static mixing device may be any mixing device without movable parts.

As mentioned, the frame includes a first and a second sealable region. As used herein, a sealable region of the frame is a structure adapted to hold or accommodate, or contribute to the accommodation of, an object such as a flexible substrate container, and which is sealable against at least one counterpiece such as to enclose such object within a sealed space.

For example, a sealable region may be shaped as a cavity. In this context, a cavity in a frame or in a tray portion of a frame refers to a part of a surface which may be indented or depressed and shaped for receiving one or more objects, such as a substrate container.

Alternatively, a sealable region or a cavity may be formed by a rim, such as a circumferential rim arranged on or extending from the frame, even in the absence of a depression of an otherwise flat part of the frame. For the avoidance of doubt, the expression "cavity" does not require the flexible container to fit entirely into the respective cavity; especially when filled with a fluid substrate, a flexible container may have a height that somewhat exceeds the height of the cavity which holds the container. In some non-limiting embodiments, the first and/or the second sealable region is defined by a circumferential rim extending from the frame.

The circumferential rim may be arranged for sealingly receiving a counterpiece having a cavity for accommodating the respective flexible substrate container. In some related non-limiting embodiments, both the first and the second sealable region represents a substantially flat region of the frame with a circumferential rim extending from the frame and adapted for sealingly receiving a counterpiece having a cavity for at least partially accommodating the respective flexible container. As understood by a person skilled in the art, the extent to which the structure or shape of the sealable region and the structure or shape of the counterpiece contribute to the overall shape of the sealed space in which the flexible substrate container is enclosed may vary.

In related non-limiting embodiments, the frame may be designed to include a tray portion. A tray portion, in this context, may be broadly understood as a relatively flat structure, that may be interrupted by openings, designed for holding one or more objects. Such tray or tray portion may include the first and the second sealable region in the form of cavities. As mentioned, a cavity may be shaped by a depression provided in an otherwise flat portion of, e.g. the tray portion of the frame, and/or it may be shaped by providing a rim arranged on or extending from the tray. The frame, and in another non-limiting embodiment, the tray portion of the frame, may further include a means for holding the static mixing device. This means may also be shaped as, or include, a cavity or recess, but other structures such as a rim or clips may also be used.

According to the present aspect of the disclosure, the frame has an operating orientation. In other words, it is configured to hold the specified components in a specific orientation in which the process of mixing or reacting the two substrates to obtain the product is to be conducted. As mentioned, the frame is configured such that, in its operating orientation, the first and the second sealable region or cavity and the means for holding the static mixing device are spatially arranged such that a flow of fluid from the first and the second substrate container to the static mixing device occurs at least partially in an anti-gravity direction, or that a flow of fluid from the static mixing device to the waste or product container occurs at least partially in an anti-gravity direction, or both. In this context, the expression "at least partially in an anti-gravity direction" should be understood such that at least for a part of the respective flow path, the downstream end is at a higher position than the upstream end, without requiring a flow direction which is exactly the opposite of (i.e. at an angle of 180° to) the direction of the gravity force.

As will be clear to the skilled person, and for the avoidance of doubt, the frame as disclosed herein is not configured to be used in the context of microfluidics, or as part of a microfluidic system or device. Microfluidics refers to systems that manipulate very small amounts of fluids using small channels with sizes of ten to hundreds of micrometers. Moreover, microfluidics makes use of the behavior of fluids at the microscale which differs from "normal" or macrofluidic behavior in that factors such as surface tension, energy dissipation, and fluidic resistance are dominant in the system. In contrast, the conduits which the frame is configured to hold, including the conduits that fluidically connect the outlet port of the first substrate container with the first inlet port of the static mixing device, the outlet port of the second substrate container with the second inlet port of the static mixing device, and the outlet port of the static mixing device with the inlet ports of the waste container and the product container are non-microfluidic conduits. For example, their internal diameters are typically in the range of at least one millimeter, or several millimeters, such as from about 1 mm to about 10 mm. Moreover, in some non-limiting embodiments, the conduits are flexible (e.g. flexible tubes) and reversibly connectable with the ports which they are adapted to fluidically connect. These properties further differentiate the present disclosure from microfluidic systems.

Accordingly, the static mixer is not a microfluidic mixer but configured to mix fluids at a macrofluidic scale, even though the scale may be considered small compared to typical large-scale pharmaceutical manufacturing processes. In some non-limiting embodiments, the static mixer is adapted for mixing fluids at a total flow rate of about 10 mL to about 1,000 mL per minute. In other non-limiting embodiments, the static mixer is adapted for mixing fluids at a total flow rate of about 20 mL to about 600 mL per minute, or of about 30 mL to about 300 mL per minute, respectively.

Also in respect of dimensions, and according to some further non-limiting embodiments, the first and the second sealable region are shaped and dimensioned such as to hold flexible substrate containers having an internal volume in the range from about 10 mL to about 3,000 mL, are also sealable regions that are shaped and dimensioned such as to hold flexible substrate containers having an internal volume in the range from about 50 mL to about 1,500 mL, respectively. Other substrate containers have internal volumes of about 300±100 mL, 500±200 mL, 1,000±300 mL, and 1,500±300 mL, respectively. In some related non-limiting embodiments, the flexible product container has an internal volume in the range of about 50 mL to about 4,000 mL, or in the range from about 100 mL to about 2,000 mL, or from about 300 mL to about 2,000 mL, respectively.

In some non-limiting embodiments, the first and the second flexible substrate containers differ in size. For example, the internal volume of the first substrate container may be larger than that of the second substrate container. In some non-limiting embodiments, the internal volume of the first substrate container is about 1.5 to about 4 times larger than that of the second substrate container. Accordingly, the shape and dimensions of the first and second sealable region are adapted to hold such substrate containers with differing sizes. In some non-limiting embodiments, the first and the second sealable region are substantially similar or identical in height (or length, depending on the operating orientation of the frame, as discussed below) and substantially different in width. For example, the width of the first sealable region may be larger than the width of the second sealable region, such as by the factor of 1.5 or more.

In some further non-limiting embodiments, the first and the second sealable region are positioned in close proximity to one another, such as to minimize the dimensions of the frame and the length of the conduits required for the flow of liquids from the substrate containers to the static mixer, thus reducing the dead volume of the flow path. The first sealable region and the second sealable region may be located adjacent to one another, and wherein the smallest distance between the first sealable region and the second sealable region is less than 10% of the width of the first sealable region.

In some non-limiting embodiments, the frame further includes means for holding or affixing the flexible product container and/or the flexible waste container. For example, the means for holding these containers may be represented by cavities, and such cavities may be provided in the tray portion of the frame. Alternatively or additionally, means such as hooks, protrusions, pins or the like may be provided for holding or affixing these containers. In some of the non-limiting embodiments, the means are adapted to allow a reversible fixture of the respective container to the frame. In this context, a reversible fixture should be understood as a fixture which is easily reversible by a user in a non-destructive manner, for example, without tools.

Moreover, various options for positioning the means for holding or affixing the flexible product container and/or the flexible waste container exist. In some non-limiting embodiments, the frame is configured to hold the product container and the waste container on the same side of the frame. In other non-limiting embodiments, these two containers are affixed on different sides of the frame. In some of the non-limiting embodiments, the frame has a front side which in its operating orientation faces the user and a back side which is opposite to the front side, and wherein the means for affixing the flexible product container is arranged at the front side of the frame and the means for affixing the flexible waste container is arranged at the front side or at the back side of the frame. An advantage of this configuration is that the space for holding these containers provided by a frame having given dimensions is used more efficiently.

In this context, the front side or user-facing side should be understood broadly and independently of the operating orientation of the frame. For example, for a frame having a vertical operating orientation, the front side will also be oriented vertically, whereas for a frame having a horizontal operating orientation, the front side will also be oriented horizontal, and typically the upwards facing side of the frame.

In some of the non-limiting embodiments, the frame is adapted for a vertical operating orientation. This means that any cavities provided to hold the substrate containers and/or the product and waste containers may not be sufficient to hold the respective containers in place during operation. Accordingly, the first and the second sealable region may each include one or more means for affixing the respective flexible substrate container.

In some of the non-limiting embodiments, the one or more means for affixing the flexible substrate containers are arranged at the front side of the frame. Again, such means may be means adapted for reversibly affixing the respective containers, as described above in a related context. The means may be shaped as hooks, protrusions or pins arranged for receiving flexible substrate containers having through-holes which are positioned to match the hooks, pins or protrusions. The pins may, for example, be barbed pins or snap-lock pins.

Regarding the operating orientation of the frame and the fixture of the flexible substrate containers, the various aspects and features disclosed herein should be interpreted not only as separate individual disclosures, but also in their combination. For example, it is clear that the present disclosure would also provide a frame adapted for a vertical operating orientation with a first and a second sealable region for holding a first and second flexible substrate container provided on the front side of the frame, wherein the sealable regions each include means for affixing the respective substrate container, and wherein the means are arranged on the front side of the frame such as to enable the fixture of the substrate containers to the frame on its front side.

In some non-limiting embodiments, the frame or the tray portion of the frame includes cavities not only for the first and the second substrate container, but also a cavity for the flexible product container or a cavity for the flexible waste container, or both. Such non-limiting embodiments require a rather large tray portion or tray area relative to the size of the entire frame. By virtue of these further cavities, the tray portion may represent a larger portion of the frame than any other portion of the frame. In some further non-limiting embodiments, the entire frame may be shaped as a tray. Alternatively, the tray portion includes only two cavities for containers, i.e. the cavities for the two specified substrate containers. In one non-limiting embodiment, the tray portion of the frame includes only cavities for the first and second substrate container, and may also include a cavity for the flexible product container.

In some non-limiting embodiments, the first and the second cavity for holding the first and the second substrate container are both located within a larger recess of the tray portion. Since a recess, in this context, may also have the general shape of a tray cavity, the two cavities for individually holding the two substrate containers may also be considered sub-cavities of a larger cavity. Still, it is required that for each of the two substrate containers an individual sealable region or cavity is provided which is in principle sealable against the other cavity.

As mentioned, the first and second sealable regions may be shaped as cavities. While the cavities may in principle be shaped to accommodate and hold the first and the second substrate container, additional affixture of the containers may be useful for better handling. In some non-limiting embodiments, the first and the second cavity, or, for example, each of the first and the second cavity, includes one or more means for affixing the respective flexible substrate container. This brings about the additional advantage that the frame, while holding the containers, may be tilted without the containers falling out of the cavities. In some non-limiting embodiments, the one or more means are adapted for reversibly affixing the substrate containers such as to allow easy and non-destructive removal of the containers after use.

According to some further non-limiting embodiments, at least two means for affixing the flexible substrate container are provided in one or more of the sealable regions, or tray cavities, such as two, three or four means. One advantage of these non-limiting embodiments is that the respective container can be held more stably in its desired position. A further advantage is that a particular spatial arrangement that is specific for each sealable region or cavity can be selected which helps the user or operator to match each container with the correct sealable region or cavity.

For example, a fixture system may be used which includes protrusions or pins arranged in the sealable regions or cavities and through-holes provided in the peripheral zones of the flexible containers, i.e. at a distance to the lumen of the respective container. Advantageously, the position of the protrusions or pins may match the position of the through-holes of the containers, but the spatial arrangement may be different for each sealable region or cavity and matching container. As mentioned, in some non-limiting embodiments, the means for affixing the flexible substrate container are shaped as protrusions or pins for receiving a flexible substrate container having through-holes which are positioned to match the pins or protrusions. In this specific context, the protrusions or pin may be snap-fit pins, such as pins with arrow heads or mushroom-like heads.

The spatial arrangement of the means for affixing may be used not only for ensuring that the correct container is affixed to a sealable region or inserted into a cavity, but also to facilitate its fixture or insertion in the desired, or correct, orientation. In some non-limiting embodiments, therefore, the means for affixing the respective flexible substrate container are adapted such as to affix the respective flexible substrate container only when said container has a desired orientation.

In some non-limiting embodiments, the flexible product container and/or the flexible waste container, or only the flexible waste container, is reversibly affixed to the frame itself directly by an affixing means. In other words, the frame does not include a cavity or sealable region for holding said container or containers. A fixture system analogous or similar to the system used for holding the substrate containers as described herein may be used, e.g. a system which includes protrusions or pins arranged on the frame or a non-recessed part of the frame portion, with through-holes provided in the peripheral zones of the flexible containers. In some non-limiting embodiments, the fixtures on the frame may be arranged such that the flexible waste container is reversibly affixable on the surface of the frame opposite to the fixtures provided and arranged for affixing the flexible substrate containers, and the product container. As mentioned, the means for affixing the flexible product container may be arranged at the front side of the frame and the means for affixing the flexible waste container may be arranged at the back side of the frame.

Further techniques may be used to ensure the correct operation of the frame and the components which it holds. In some non-limiting embodiments, for example, the frame includes an identification tag. In some further non-limiting embodiments, the identification tag is a radio-frequency identification (RFID) tag. Also are non-limiting embodiments in which one or both of the substrate containers have identification tags, such as RFID tags.

As mentioned, the frame may be configured to be operated in a specific operating orientation. In some non-limiting embodiments, the operation orientation is horizontal, or substantially horizontal. In other non-limiting embodiments, the operation orientation is vertical, or substantially vertical. As used herein, a horizontal orientation of the frame in principle means that its two larger dimensions are on a horizontal plane, whereas its smallest dimension lies on a vertical plane. Vice versa, a vertical orientation of the frame is given when its two larger dimensions are on a vertical plane and its smallest dimension lies on a horizontal plane. The modifying term “substantially” takes into account that the frame, which may typically have a somewhat flat or planar overall shape, will however not be perfectly flat or planar.

The frame, in particular a frame whose operation orientation is vertical, may further include one or more means for being affixed or held in its proper position and orientation. For example, the frame may include one or more through-holes which are adapted to match protrusions or hooks provided by an apparatus configured for operating the frame or the kit including the frame, as defined herein.

Not only the frame may have an operating orientation. As mentioned, the orientation may also be important for the containers, such as the flexible substrate containers. In some further non-limiting embodiments, also the static mixing device has an operating orientation. The frame may advantageously be adapted to ensure that the static mixing device can only be mounted in the proper, i.e. the desired orientation. In particular, the means for holding the static mixing device may be adapted such as to hold the static mixing device only when the static mixing device has a desired orientation. For the avoidance of confusion, the desired orientation of the static mixing device is defined relative to the frame. The desired orientation of the static mixing device is identical with its operating orientation provided that the frame is also in the operating orientation.

In some related non-limiting embodiments, the desired orientation of the static mixing device is such that a flow of liquid out of the static mixing device through its outlet port occurs in an anti-gravity direction when the frame is in its operating orientation. Such upward or anti-gravity flow of liquid in the static mixing device has been found to reduce undesired mixing effects, such as bubble formation.

As described above, at least partial anti-gravity flow may also be desirable for other parts of the flow path of the fluids, for example between the substrate containers and the static mixing device. In some related non-limiting embodiments, the first and the second sealable region or cavity and the means for holding the static mixing device are arranged such that, in the operating orientation of the frame, the outlet ports of the flexible substrate containers have an inferior position relative to the position of the respective inlet ports of the static mixing device. Such configuration will require at least some upward flow of fluid. In this context, it is assumed that not only the frame itself is in the operating orientation, but also that the substrate containers and the static mixing device have been affixed in the correct orientation.

For many processes that require the mixing of two liquid substrates, the optimal ratio of the substrates to one another is different from 1:1. More typically, one of the substrates has to be provided at significantly higher amounts and/or at a higher rate than the other. Therefore, the two substrate containers may differ in size, and accordingly, in some non-limiting embodiments, the first and the second sealable region or cavity differ in size. In this context, the size of a sealable region or cavity primarily refers to the size of the flexible container that it can hold. Also, a difference in size of a sealable region or cavity is reflected in a difference in volume of that sealable region or cavity, or of the pressure chamber formed by the sealable region when covered by the first counterpiece as further described below, which in turn requires a difference in at least one of the dimensions of the sealable region. In some non-limiting embodiments, the volume of one of the two cavities or pressure chambers is at least about 50% larger than that of the other cavity or pressure chamber, relative to the volume of the smaller cavity or pressure chamber. Also are non-limiting embodiments according to which both the length (i.e. the largest dimension) and the width (i.e. the second largest dimension) of one of the two cavities or sealable regions is larger than the length and width of the other cavity or sealable region.

As already mentioned, the frame is particularly useful for the pump-free, aseptical preparation of sterile liquid products by mixing or reacting two fluid substrates in small batches, wherein the fluids are forces by pressure through a mixing device. The pressure may, for example, be provide by means of a pressurized gas. Such pressure-driven systems are, for example, described in the co-pending patent application EP21206216, or WO 2023/079039 A1, the full disclosure of which is incorporated herein by reference.

If pressurized gas is to be used for forcing fluid to flow from the flexible substrate containers through the conduits into the static mixing device, the sealable regions or cavities in which the containers are held must be tightly closed such as to form pressurisable chambers (e.g. by applying a lid or another type of counterpiece to cover the sealable region or cavity), and the pressurized gas must be introduced into these chambers in a controlled manner.

For this purpose, in some non-limiting embodiments, the frame or the tray portion thereof is provided with a first through-hole arranged in the first sealable region and a second through-hole arranged in the second sealable region. Again, the sealable regions may be provided as cavities. As used herein, a through-hole should be understood as any opening in the sealable region through which the sealable region can be pressurized with a gas from the outside of the frame when the sealable region is otherwise covered and sealed, regardless of the size and shape of the through-hole. For example, the through-hole may have dimensions that are not so much smaller than those of the sealable region, as for example seen in FIG. 3.

With respect to the spatial arrangement of the first and the second sealable region or cavity to one another, various options exist. In some non-limiting embodiments, the first and second sealable region or cavity are arranged to hold the flexible substrate containers such that the outlet port of the first flexible substrate container and outlet port of the second flexible substrate container are co-axially opposed. In some further non-limiting embodiments, the outlet port of the first flexible substrate container and outlet port of the second flexible substrate container are co-axially opposed at an angle of about 45° to the longitudinal central axis of the frame.

In some non-limiting embodiments, the first and second sealable region are arranged to hold the flexible substrate containers such that the outlet port of the first flexible substrate container and outlet port of the second flexible substrate container are co-axial and not opposed. In one non-limiting embodiment, first and second sealable region or cavity are arranged to hold the flexible substrate containers such that that a flow of liquid out of the respective flexible substrate containers through its outlet port occurs in an anti-gravity direction when the frame is in its operating orientation. These non-limiting embodiments are particular advantageous when the operating orientation of the frame is vertical.

The frame may also be adapted to hold the flexible product container in a particular orientation only. This may be achieved, for example, by the configuration of the means for holding the container. In some non-limiting embodiments, the operating orientation of the frame is vertical and also adapted to hold the product container in a vertical orientation, with its inlet port for receiving liquid from the static mixer being either in a horizontal orientation, or in a vertical orientation and such that the influx of liquid from the static mixer through the inlet port occurs in an anti-gravity direction. Such vertical orientation of the container and the inlet port may be advantageous, for example, in case it is intended to dilute the liquid received from the static mixer with a liquid diluent that is provided as a pre-fill in the product container, such as to enhance the mixing of the respective liquids on the product container. The horizontal orientation of the inlet port may be advantageous if an inline or subsequent dilution of the liquid received in the product container from the static mixer is intended. In this context, inline means that the liquid diluent is supplied to the product container while said container also received liquid from the static mixer, and subsequent means that the liquid diluent is supplied after the product container no longer receives any liquid from the static mixer.

As described above, it may be desirable to minimize the length of the conduits, at least of those conduits that are arranged between the substrate containers and the static mixing device. In addition, it was found advantageous to accommodate these conduits within the same sealable region or cavity as the respective substrate container. An advantage of such non-limiting embodiments is that, in the case pressurized gas is used as a driving force for the liquids, the conduits are not subjected to any significant differential pressure during operation as they are located inside the same pressurized zone as the flexible substrate containers that they are connected with. A further advantage is that no high-pressure seal against a conduit is required; if the conduit is accommodated within the sealable region or cavity, the sealing may be against the mixing device which is mechanically more stable than the conduit. In some non-limiting embodiments, therefore, the first sealable region or cavity is shaped to at least partially accommodate the conduit for fluidically connecting the outlet port of the first substrate container with the first inlet port of the static mixing device. In related non-limiting embodiments, the second sealable region or cavity is shaped to at least partially accommodate the conduit for fluidically connecting the outlet port of the second substrate container with the second inlet port of the static mixing device; or both the first and the second sealable region or cavity are shaped accordingly.

The frame may further contain one or more means for holding the conduits for fluidically connecting the outlet port of the static mixing device with the inlet ports of the waste container and the product container. Again, such means may be shaped as recesses or cavities in the frame or the tray portion of the frame into which the conduits can be at least partially inserted. As used in the context of holding means, recesses and cavities may be used interchangeably. The method of holding the conduits in cavities is particularly suitable for short conduits. As mentioned, it may be desirable to keep the conduits short in order to have little dead space for fluid which could reduce the product yield, especially when manufacturing small product batches. Alternatively, or additionally, other holder may be provided, such as clamps, clips, sleeves, and the like.

In some non-limiting embodiments, the frame further includes one or more means for holding a valve which can be arranged within the conduit for fluidically connecting the outlet port of the static mixing device with the inlet port of the waste container or with the product container. For example, one or two valves may be foreseen to control the flow of fluid from the static mixing device to the waste container and to the product container. Such valves may also help prevent backflow from the product container during or at the end of a batch process. For example, one diverter valve may be used to initially direct the liquid into the conduit connected with the waste container, and once a stable mixing process is achieved, the diverter valve may direct the fluid into the product container. Alternatively, two valves such as pinch valves or other stopcock valves may be used for this function, the first one being arranged within the conduit or fluid path between the static mixing device and the waste container, and the second one between the static mixing device and the product container. Again, the holder or holding means for such valve (or valves, as the case may be) may be configured as a recess or cavity in the frame or the tray portion of the frame within which the valve is received and held in place. Alternatively, one or more rims, clamps, clips or other structure may be used for this purpose, or even a combination of both.

In some related non-limiting embodiments, the frame is adapted for holding a Y- or T-piece, wherein the Y- or T-piece is arranged within the conduits which fluidically connect the outlet port of the static mixing device with the inlet ports of the waste container and the product container, such that an inlet of the Y- or T-piece is fluidically connected with the outlet port of the static mixing device, a first outlet of the Y- or T-piece is fluidically connected with the inlet port of the waste container, and a second outlet of the Y- or T-piece is fluidically connected with the inlet port of the product container.

In some further related non-limiting embodiments, a one-way stopcock valve may be arranged downstream of the Y- or T-piece, i.e. in the conduit portion that fluidically connects the first outlet of the Y- or T-piece with the inlet port of the waste container and/or in the conduit portion that fluidically connects the second outlet of the Y- or T-piece with the inlet port of the product container. In both these positions, a one-way stopcock valve may be arranged. In this context, a one-way stopcock valve should be understood as a one-way valve having an open state and a closed state, and no pressure-reducing or flow-regulating function. The one-way stopcock valve may be capable of being operated such as to switch rapidly from its closed state to its open state, in particular within less than one second, or even within less than 0.5 seconds.

The one-way stopcock valve, or each of the one-way stopcock valves, may include a means for mechanically operating the valve, wherein said means may be oriented towards, or adapted to be operated from a direction that corresponds to the back side of the frame. Such configuration would allow the valve to be operated by an automatic operator device arranged behind the frame when viewed from the front side, for example when the frame is inserted in an apparatus as described in more detail below. In one non-limiting embodiment, the frame is adapted for, or includes at least one means for holding or affixing a valve to the frame.

In some further non-limiting embodiments, a check valve is arranged in the conduit, or conduit portion, that fluidically connects the first outlet of the Y- or T-piece with the inlet port of the waste container. If this conduit or conduit portion also includes a one-way stopcock valve as described above, the check valve is positioned downstream of the one-way stopcock valve. This check valve may be advantageous in case it is intended to remove residual gas or air from a flexible substrate container prior to starting the mixing process. If the substrate container is oriented such that the respective outlet port is vertically oriented to allow fluid to exit in an anti-gravity direction, the container may be degassed by slightly squeezing it while the stopcock valve upstream of the waste container is in its open state, which will push the air or gas towards the waste container. The check valve will then prevent any reflux of gas or air when the substrate container is not squeezed for degassing any more. Examples of potentially suitable check valves include duckbill, ball, swing, piston, butterfly, and tilting-disk valves. In some non-limiting embodiments, the check valve is a duckbill valve.

In some further non-limiting embodiments, the means for holding the static mixing device itself is shaped as a recess or cavity in the frame or tray portion of the frame. As discussed above, and according to one of the non-limiting embodiments of the present aspect of the disclosure, the frame in its operating orientation is arranged such that a flow of liquid through the outlet port of the static mixing device is in an upward or anti-gravity direction. Accordingly, the cavity for holding the mixing device may be shaped and oriented such as to allow the insertion of the mixing device only in its desired orientation, which is the operating orientation in the case that the frame as such is also in its operating orientation. One or more additional means for holding the mixing device may also be used, such as a clamp.

According to some further non-limiting embodiments, the frame or the tray portion thereof includes a circumferential gasket for each of the first and the second sealable region or cavity. The use of gaskets for sealing the first and the second sealable region or cavity against a counterpiece is generally, especially if it is intended to pressurize the cavities when holding the respective substrate containers and when covered with such counterpiece. In principle, the gaskets may be pre-arranged either on the frame or tray portion thereof, or on the counterpiece, and it is presently to provide the gaskets together with the frame, i.e. to provide a frame which includes the gaskets. One gasket may be provided that is shaped as a circumferential seal individually around the first sealable region or cavity and around the second sealable region or cavity. In a further non-limiting embodiment, each of the first and second sealable region or cavity of the frame is independently enclosed by a first circumferential gasket arranged on a front side of the sealable region (e.g. the user-facing side with respect to the frame), and a second circumferential gasket arranged on the back side of the frame around the sealable region. As understood herein, the circumferential gasket may be adapted independently for the first and second sealable region or cavity and/or front or back side of the sealable region. Moreover, the gasket or gaskets which seal the first and the second sealable region or cavity may also be shaped such that a gasket portion also seals the respective sealable region or cavity against a portion of the static mixing device, such as against one of the inlet ports. Alternatively, an inlet port of the static mixing device may be sealed against a hollow tubular structure provided in the frame, such as in the circumferential rim that defines a sealable region or cavity.

As already described, it is often desirable to minimize the dead volume that can lead to fluid loss and reduced product yield. It is therefore to use relatively short conduits between the various containers and the static mixing device. In line with this objective, and according to some further non-limiting embodiments, the distance between the first and the second sealable region or cavity is relatively short, such as less than half the length of each of the sealable regions or cavities. In this context, the length of a sealable region or cavity is its largest dimension, and the distance should be understood as the shortest distance between a locus on the contour of the first sealable region or cavity and a locus on the contour of the second sealable region or cavity. Keeping in mind that the dimensions of the two sealable regions or cavities may differ from one another, the distance between the two sealable regions or cavities should be smaller than the length of the smaller one of the sealable regions or cavities.

In accordance with the use of the frame, some further non-limiting embodiments provide that the frame is adapted to be insertable in its operating orientation into an apparatus for aseptically mixing two fluids, wherein the apparatus includes a counterpiece for sealingly covering the first and the second sealable region, and means for exerting pressure on the first and the second flexible substrate container when affixed to, or inserted in the first and the second sealable region. With respect to the apparatus which is part of the present disclosure and relates to one of its further aspects, reference is made to the respective sections of the detailed description below.

As will be understood by a skilled person, the disclosure encompasses the frame as described above as such, as well as the frame with the specified components in the assembled state. In other words, in some non-limiting embodiments, the frame holds the first and second substrate container, the flexible waste container, the flexible product container, the static mixing device and the conduits for fluidically connecting the outlet port of the first substrate container with the first inlet port of the static mixing device, the outlet port of the second substrate container with the second inlet port of the static mixing device, and the outlet port of the static mixing device with the inlet ports of the waste container and the product container. Moreover, in these non-limiting embodiments, the conduits may actually be fitted such as to fluidically connect the outlet port of the first substrate container with the first inlet port of the static mixing device, the outlet port of the second substrate container with the second inlet port of the static mixing device, and the outlet port of the static mixing device with the inlet ports of the waste container and the product container. Accordingly, the assembled frame may be ready to use, for example by filling the flexible substrate containers with the first and the second substrate, unless pre-filled substrate containers have been assembled in the frame.

In some non-limiting embodiments, the frame is adapted to be insertable into an apparatus for aseptically mixing two fluids as described above, wherein said pressure is exerted by a pressurized gas contacting an external surface of the first flexible substrate container and an external surface of the second flexible substrate container, wherein said pressurized gas is provided to said surfaces through the first through-hole arranged in the first sealable region and the second through-hole arranged in the second sealable region. In other words, the apparatus is configured to externally pressurize the flexible substrate containers via the through-holes arranged in the sealable regions such as to drive the fluids out from the substrate containers towards the static mixing device.

For this purpose, the back side of the frame, as previously defined, may be adapted for being sealed against a second counterpiece by circumferential gaskets that individually encircle the first and the second through-hole. The circumferential gaskets may be provided by the frame and be arranged on its back side, or they may be provided by and be arranged on a surface of the second counterpiece configured to contact the frame.

In some non-limiting embodiments, the first counterpiece and the second counterpiece are hingingly connectable or connected to one another. Especially if the frame has a vertical operating orientation, it may further include one or more means or structures configured for holding or reversibly attaching the frame to the second counterpiece in a predetermined position. For example, the frame may exhibit two or more through-holes that match corresponding hooks or protrusions provided on the contacting surface of the second counterpiece. In this manner, the frame fitted with the flexible containers, the static mixing device, the conduits and any other components as described above, may be attached to the second counterpiece, and then the first counterpiece may be placed against the second counterpiece such as to enclose the frame. This would result in the sealable regions in the frame being in sealing contact with the first counterpiece, whereas the back of the frame would be in sealing contact with the second counterpiece.

In a further aspect, the disclosure relates to a kit including the frame as described herein. The kit further includes any one or combination of the following components: (a) the first and/or the second flexible substrate container; (b) the flexible waste container; (c) the flexible product container; (d) the static mixing device; and/or (e) one or more conduits for fluidically connecting the outlet port of the first substrate container with the first inlet port of the static mixing device, the outlet port of the second substrate container with the second inlet port of the static mixing device, and the outlet port of the static mixing device with the inlet ports of the flexible waste container and the flexible product container. According to one of the non-limiting embodiments, the kit includes all of the components (a) to (e), including both the first and the second flexible substrate container and all the conduits for the specified fluid connections. In a related non-limiting embodiment, the kit also includes components which may be used in conjunction with, or which may be arranged within the conduits such as the conduits for connecting the outlet port of the static mixing device respectively with the inlet ports the flexible waste container and flexible product container. For example, the kit may include any one or combination of a T-piece, a Y-piece, or any one or combination of a valve, or any other component as described herein which may be useful for assembling the kit, operating the assembled frame or the assembled kit, or for performing any of the methods and processes as described herein.

In some of the non-limiting embodiments, the flexible substrate containers, the flexible waste container, and the flexible product container are containers as disclosed hereinabove. In particular the flexible product container may include at least one inlet port and/or at least one outlet port to which a flexible tube including an aseptic disconnector is fluidically connected. Moreover, the flexible tube fluidically connected to at least one outlet port of the product container may have a downstream end which is fluidically connected to a sampling tube, and the sampling may have a downstream end which is fluidically connected to a sterile filter.

In some non-limiting embodiments, the kit is provided with empty substrate containers, so that the user can fill the substrate containers with fluid materials of interest. In some other non-limiting embodiments, the kit is provided with the first and the second container already being filled, for example, with liquid substrates. If so, the liquid substrate contained in the first flexible substrate container, also referred to as the first substrate, may differ from the liquid substrate contained in the second flexible substrate container, also referred to as the second substrate. The first and the second substrate are typically selected such as to form, upon mixing in the static mixing device, a liquid product, such as a liquid pharmaceutical composition for injectable use. As mentioned, the frame and thus also the kit including the frame are particularly useful for the preparation of sterile liquid products in small batches using a simplified, standardized, substantially error-proof process relying on disposable components which do not need to be cleaned after the preparation of a batch. Consequently, the preparation of small batches of sterile injectable products can be highly efficient based on the present disclosure.

An example of a type of sterile product which can be prepared by mixing two liquid substrates are pharmaceutical compositions including lipid nanoparticles (LNPs), liposomes or similar colloidal carriers of active ingredients. Some modern mRNA-based vaccines, for example, are based on LNPs which may be prepared by mixing an organic solution of lipids with an aqueous solution of mRNA. In some non-limiting embodiments, accordingly, the first flexible container is filled with a first substrate including a, for example, sterile organic solution of one or more lipids capable of forming LNPs, and the second flexible container is filled with a second substrate including a, for example, sterile aqueous solution of an mRNA, such as an mRNA capable of expressing an antigen.

It was already mentioned that the kit according to an aspect of the disclosure may include some or all of the components that are required to assemble the frame such that it is ready to use. Also within the scope of the disclosure are kits that represent sub-selections of any components that are configured for use with the frame. For example, a kit may only include the empty or prefilled first and second flexible substrate containers that are configured for the preparation of a particular product.

In some non-limiting embodiments, the flexible product container is partially prefilled with a third substrate. Such third substrate may be used as a further component of the final product for which it is desirable to add it only after the mixing process, i.e. the mixing of the first substrate with the second substrate in the static mixing device. For example, the third substrate may be a diluent, such as a sterile aqueous diluent or a sterile aqueous buffer solution. For example, the formation of mRNA-loaded LNPs by mixing an organic lipid solution and an aqueous mRNA solution may be better and more efficiently achieved at a first pH, whereas the long-term stability of the final product is higher at a second pH. In such case, it may be useful to partially prefill the flexible product container with a sterile aqueous buffer for buffering the final product at the second pH.

Again, the flexible product container may be provided in empty form or partially prefilled, and it may be provided together with the frame and/or with any other components required for assembling the frame such as to be ready to use.

The static mixing device provided for use with the frame, or to which the frame is adapted to hold, for example as part of the kit, may be selected from any static mixing devices capable of aseptically mixing two liquids. In some non-limiting embodiments, the static mixing device includes, or is, a T-piece mixer, a Y-piece mixer, a vortex mixer, a baffle-based static mixer, a microfluidic mixing device, a multi-inlet vortex mixer, or a jet impingement reactor. In some of the non-limiting embodiments, the static mixing device is a jet impingement reactor.

Jet impingement reactors are fluid reactors for mixing fluids or for generating particulate fluids by collision. They can, for example, be used for the production of nanoparticle fluids incorporating poorly water-soluble active ingredients. The function of these reactors is based on the use of two fluid streams, at least one of which typically contains the active ingredient, that are injected into a reactor cavity and collide at a turbulent mixing zone, thereby creating the nanoparticles. One of the main principles used in connection with the jet impingement reactors is the solvent/non-solvent precipitation in which a first fluid including the active ingredient dissolved in a suitable solvent is contacted with a non-solvent or antisolvent under defined conditions results in the precipitation of the nanoparticles containing the active ingredient. In case one of the solvents contains a lipid, lipid nanoparticles can be produced with help of the jet impingement reactors which may, for example, be subsequently loaded with a biologically active compound, e.g., by pH shift.

Jet impingement reactors include a reaction chamber having two fluid inlets with nozzles that allow the two fluids to be injected into the reaction chamber with a pressure that is typically higher than ambient pressure. Through the first and the second fluid inlet, two streams are injected such as to meet inside the reaction chamber and form the collision or mixing zone. An outlet for obtaining the resulting product is also provided.

One example for a jet impingement reactor is the microjet reactor as disclosed in EP 1165224 B1. Such a microjet reactor has at least two nozzles or pinholes located opposite one another, each with an associated pump and feed line for directing a liquid towards a common collision point in a reaction chamber enclosed by a reactor housing. The reaction chamber includes two bores that cross each other and yield in a small cavity in which two fluids collide, possibly without contacting the walls of this cavity. While one of the bores accommodates the two fluid inlets, the second bore accommodates a further opening in the reactor housing through which a gas, an evaporating liquid, a cooling liquid, or a cooling gas can be introduced to maintain the gas atmosphere in the reaction chamber or for cooling. A further opening at the other end of the second bore is provided for removing the resulting products and excess gas from the reactor. If a solvent/non-solvent precipitation is carried out in such a microjet reactor, a dispersion of precipitated particles is obtained. The reactor is also adapted for using a third fluid, which is an external source of a gas or cooling liquid.

WO 2018/234217 A1 discusses another jet impingement reactor having a housing which encloses a reaction chamber, a first fluid nozzle and a second fluid nozzle oriented in a collinear manner. The second nozzle is located directly opposite the first fluid nozzle in the jet direction of the nozzles. The nozzles reach into the reaction chamber and form a collision zone in form of a disk between each other. This reactor type has at least one rinsing fluid inlet arranged on the side of the first fluid nozzle and at least one product outlet arranged on the side of the second fluid nozzle and can be used for continuous preparation of the particulate fluids.

Additionally, rinsing fluid-conducting structures are designed as parallel channels on a side of the first fluid nozzle that produce a rinsing fluid flow directed in the jet direction of the first fluid nozzle and that lead the rinsing fluid in the direction of the collision disk causing a slight deformation of the collision disk. This causes particles generated in the reactor to be conveyed away from the collision zone. Thus, the production process, when carried out in the reactor as discussed in WO 2018/234217 A1 depends on the presence of the rinsing fluid-conducting structures and of a rinsing fluid.

In some of the non-limiting embodiments, the jet impingement reactor used in the context of the present disclosure is a device as discussed in WO 2023/025736 A1, the entire disclosure of which is incorporated herein by reference. The jet impingement reactor includes a reaction chamber defined by an interior surface of a reaction chamber wall, wherein the reaction chamber has a substantially spheroidal overall shape. The reaction chamber further includes a first and a second fluid inlet, wherein the first and the second fluid inlet are arranged at opposite positions of a first central axis of the reaction chamber such as to point at one another, and wherein each of the first and the second fluid inlet includes a nozzle; and a fluid outlet arranged at a third position, said third position being located on a second central axis of said chamber, the second central axis being perpendicular to the first central axis. Moreover, the distance between the nozzle of the first fluid inlet and the nozzle of the second fluid inlet is the same or smaller than the diameter of the reaction chamber along the first central axis.

In some non-limiting embodiments, each nozzle has a downstream end that substantially aligns with the interior surface of the chamber wall. Moreover, the reaction chamber may be free of further inlet or outlet openings. According to a further aspect, each of the first and the second fluid inlet is provided by a fluid inlet connector having an upstream end, a downstream end holding the nozzle of the first or second fluid inlet, and a fluid conduit for conducting a fluid from the upstream end to the downstream end, wherein the downstream end of each fluid inlet connector is reversibly insertable into the chamber wall such as to provide the first and the second fluid inlet.

The reactor is useful for mixing two fluids by a method including the steps of providing the jet impingement reactor according to the disclosure; directing a first fluid stream through the first fluid inlet into the reaction chamber; and directing a second fluid stream through the second fluid inlet into the reaction chamber such as to collide with the first fluid stream at an angle of about 180°.

Moreover, in some of the non-limiting embodiments, the orifice of the first nozzle is larger than the orifice of the second nozzle and/or the flow rate of the first fluid is larger than the flow rate of the second fluid, and wherein the pressure of the first fluid and of the second fluid may be adapted such as to cause the first fluid stream and the second fluid stream to have substantially the same kinetic energy when entering the reaction chamber.

The jet impingement reactor as discussed in patent application WO 2023/025736 A1 may be made by injection molding. For example, the jet impingement reactor or at least the reactor wall, may be made from a thermoplastic polymer by injection molding, wherein prefabricated inlet nozzles consisting of a hard, non-thermoplastic material such as metal, glass or ceramic are inserted into the mold during the injection molding process, or wherein mechanical or laser drilling is used to manufacture the nozzles on both sides of the reactor.

Another jet impingement reactor particularly useful for carrying out the disclosure is a device as described in co-pending patent application EP 22195145.2, the full disclosure of which is incorporated herein by reference. The jet impingement reactor includes a housing made of a polymeric material, the housing enclosing a reaction chamber, said chamber having a substantially spherical shape, wherein the spherical shape is only interrupted by: at least a first and a second fluid inlet, wherein the first and the second fluid inlet are arranged at opposite positions on a first central axis of the reaction chamber such as to point at one another, and wherein each of the first and the second fluid inlet is provided by a nozzle; and a fluid outlet arranged at a position located on a second central axis of said chamber, the second central axis being perpendicular to the first central axis; the reactor further including a first, a second and a third fluid conduit, wherein the first and the second fluid conduit are arranged for conducting a first fluid to the first fluid inlet and a second fluid to the second fluid inlet, and wherein the third fluid conduit is arranged for conducting a third fluid from the fluid outlet in a downstream direction, the third fluid being formed by the mixture or reaction of the first and the second fluid in the reaction chamber; wherein the housing includes at least two pieces that are affixed to each other, of which a first piece includes at least a major portion of the first or the second fluid conduit and a second piece includes at least one of the nozzles.

This jet impingement reactor may also be prepared by a method including a step of injection molding the first piece and/or the second piece of the housing. It is described as particularly useful in the aseptic manufacture of a sterile liquid pharmaceutical composition.

According to a further non-limiting embodiment, the kit includes a jet impingement reactor with a reaction chamber having a substantially spherical shape; the spherical shape is interrupted by a first and a second fluid inlet, wherein the first and the second fluid inlet are arranged at opposite positions on a first central axis of the reaction chamber such as to point at one another, and wherein each of the first and the second fluid inlet is provided by a nozzle; and a fluid outlet arranged at a position located on a second central axis of said chamber, the second central axis being perpendicular to the first central axis. The reactor further includes a first, a second and a third fluid conduit, of which the first and the second fluid conduit are arranged for conducting a first fluid to the first fluid inlet and a second fluid to the second fluid inlet, and wherein the third fluid conduit is arranged for conducting a third fluid from the fluid outlet in a downstream direction, the third fluid being formed by the mixture or reaction of the first and the second fluid in the reaction chamber. Moreover, the reactor includes at least two pieces that are affixed to each other, of which a first piece is made of a polymeric material and includes at least a portion of the first or the second fluid conduit and at least a hemispherical portion of the reaction chamber; and a second piece which is at least partially insertable into the first piece, the second piece including the fluid outlet. Such reactor is described in co-pending patent application EP23163257.1 or PCT/EP2023/075054, the full disclosures of which are incorporated herein by reference.

According to some further non-limiting embodiments, each of the kit components or parts is sterile, or sterilizable by heat, irradiation or ethylene oxide. For example, the flexible containers, i.e. the substrate containers, the waste container and/or the product container may be made of similar materials as infusion bags or mixing bags for parenteral solutions, such as ethylene-vinyl acetate copolymer (EVA) which may be autoclaved or steam sterilized (e.g. 15 minutes in water steam at 121° C.), gamma sterilized (e.g. at 25-40 kGy) or sterilized with ethylene oxide. The static mixing device, even if made from a substantially polymeric material, as well as the conduits may also be provided in sterilized form, or are sterilizable.

It is noted that the subject matter of the disclosure is particularly useful for carrying out aseptic mixing processes using only sterile starting material and pre-sterilized containers and product-contacting equipment parts. In this case, no sterilization of the final product may be necessary.

The kit may include any further features that have been described in the context of the frame. In particular, and as a skilled person would understand, any aspects or features that have been disclosed above in the context of the frame should also be applied to the kit.

In a further aspect, the disclosure relates to a flexible container which is adapted for use as a flexible substrate container, a flexible waste container or a flexible product container as specified herein-above. The container has an internal space for holding a fluid material which is surrounded by a flexible front wall and a flexible back wall, each wall being made of a polymeric material. Moreover, the container further includes at least one inlet or outlet port for enabling fluid communication with the internal space. The flexible front wall and the flexible back wall are connected to one another such as to form a sealed edge which substantially surrounds the internal space. The edge includes four corner regions such that the internal space when empty has a square or rectangular overall shape. The container is further characterized in that at least two through-holes are provided in the sealed edge, of which a first through-hole is provided in or near a first corner region and a second through-hole is provided in or near a second corner region of the edge, and the second corner region is adjacent to the first corner region.

The flexible front wall and the flexible back wall may be formed from two sheets of a flexible, polymeric material having a similar size and shape which are affixed (e.g. welded) to one another such as to form a sealed (e.g. welded) edge that substantially surrounds the internal space. The two sheets may have an essentially square or rectangular overall shape, i.e. having four corners, which also translates into an essentially square or rectangular overall shape of the internal space when that is empty. In this context, a corner should be understood such as to include rounded corners. In some non-limiting embodiments, the corners of the container and/or of the internal space are rounded corners. Also in this context, the terms "essentially", "substantially" and "overall" should be understood as modifiers which allow for small deviations. For example, the sealed edge may surround the entire internal space except where the inlet or outlet port is located; and the square or rectangular overall shape may not represent the shape of a perfect square or rectangle. Moreover, the expressions "near a first corner region" or "near a second corner region" should be understood as referring to locations that are closer to the respective corner than to any central axis of the container along any of its three dimensions.

The at least two through-holes permit the container to be held by, or affixed to, complementary holding means such as pins. As discussed above in the context of the sealable regions such as the cavities in the frame or the tray portion of the frame, such means for holding a flexible container may be provided in the cavities. In addition to their fixating function, they may also contribute to assembly error prevention in that a specific spatial arrangement may be used for the through-holes and the complementary holding means (e.g. pins) such as to match only the correct or designated container and only in its desired orientation. In other words, the positions of the first and the second through-hole match the positions of the corresponding holding means provided in the sealable region or cavity of the frame or tray portion which is arranged for holding the flexible container. In some non-limiting embodiments, each flexible container has at least three through-holes. Also are containers having four through-holes.

In some non-limiting embodiments, the flexible container includes at least one inlet port and/or at least one outlet port. A flexible tube may be fluidically connected to the inlet port and/or outlet port. The tube may include an aseptic disconnector. Each inlet and outlet port of the flexible container may include an aseptic disconnector. In this context, an aseptic disconnector means a readily disconnectable transfer conduit or conduit segment such as, for example, described in WO2010/008396, or another conduit having the same or a similar functionality. Such non-limiting embodiments are particularly advantageous as flexible product containers, as they facilitate the quick removal of the product after the mixing process while minimizing the risk of microbiological product contamination.

In some further non-limiting embodiments of the flexible container, the flexible tube fluidically connected to at least one outlet port has a downstream end is fluidically connected to a sampling tube, wherein the sampling tube has a downstream end which is fluidically connected to a sterile filter. Again, such non-limiting embodiments are particularly advantageous as flexible product containers, as they allow an easy sample withdrawal from the product container without any product contamination risk.

Moreover, in some further non-limiting embodiments, the flexible container includes an identification tag, such as an RFID tag. As mentioned above, an identification tag such as an RFID tag may also be featured on the frame itself, on the static mixing device, or on any other components of the kit as specified above.

In a further aspect, the present disclosure relates to apparatus for operating the frame in its assembled state. In some non-limiting embodiments, such apparatus is an apparatus functioning as a filling station. More specifically, such apparatus may be adapted for receiving the frame as described above in its operating orientation, wherein the first and the second flexible substrate containers are empty and held in the first and the second sealable region. The apparatus further includes means for aseptically filing a first and/or a second substrate into the first and/or the second flexible substrate container, respectively. In these non-limiting embodiments, the frame is fully assembled, i.e. it holds the first and second substrate container, the flexible waste container, the flexible product container, the static mixing device and the conduits for fluidically connecting the outlet port of the first substrate container with the first inlet port of the static mixing device, the outlet port of the second substrate container with the second inlet port of the static mixing device, and the outlet port of the static mixing device with the inlet ports of the waste container and the product container. Moreover, the conduits are fitted such as to actually provide the respective fluid connections. In some non-limiting embodiments, the apparatus further includes means for partially filling the flexible product container with a third substrate, such as a diluent or an aqueous buffer solution, as described further above.

In some further non-limiting embodiments, such apparatus is an apparatus configured to function as a mixing station. Specifically, such apparatus may be adapted for receiving the frame in its operating orientation, wherein the frame is assembled and holds the first and second substrate container, the flexible waste container, the flexible product container, the static mixing device and the conduits that fluidically connect the outlet port of the first substrate container with the first inlet port of the static mixing device, the outlet port of the second substrate container with the second inlet port of the static mixing device, and the outlet port of the static mixing device with the inlet ports of the waste container and the product container. In these non-limiting embodiments, the first and the second flexible substrate containers are pre-filled, i.e. they contain the first and the second substrate, respectively. Moreover, the apparatus further includes means for forcing the first and the second substrate to flow from the first and the second flexible substrate container into the static mixing device such as to mix and form a liquid product. As a skilled person will understand on the basis of the disclosure herein-above, the liquid product will flow through a conduit from the static mixing device to the flexible waste container and/or to the flexible product container, depending e.g. on the setting of the valve(s) that may be arranged within the conduit(s) that connect the outlet port of the static mixing device with the waste container and the product container. Also in these non-limiting embodiments, the product container may be partially filled with a third substrate, as already described.

The means for forcing the first and the second substrate to flow from the first and the second flexible substrate container into the static mixing device may include one or more pumps. In some non-limiting embodiments, the means is adapted to exert pressure on the first and the second flexible substrate container such as to squeeze out the substrates. Particularly are non-limiting embodiments according to which the means for forcing the substrates to flow from the first and the second flexible substrate container into the static mixing device includes a pressurized gas. An example of a pressurized gas is pressurized air. In other words, such non-limiting embodiment provides an apparatus wherein the pressure is exerted by a pressurized gas contacting an external surface of the first and the second flexible substrate container, and wherein the pressurized gas is provided to said surface through the first through-hole arranged in the first sealable region and the second through-hole arranged in the second sealable region.

Moreover, the apparatus may include a counterpiece to the frame that sealingly covers individually the first and the second sealable region, whereby the sealable regions hold the first and the second substrate container. Each sealable region and the corresponding cover provided by the first counterpiece together form a pressurisable chamber. The chambers may be pressurized by the pressurized gas that may enter the chambers via through-holes provided in the sealable regions, as described above. The chambers may be individually sealed, i.e. also sealed against one another.

In some further non-limiting embodiments, the apparatus also includes the second counterpiece, as described above. Moreover, the first counterpiece and the second counterpiece may be hingingly connected to one another.

In some of the non-limiting embodiments, the pressurized gas is provided by pressure reservoir chambers. Such pressure reservoir chambers are adapted to hold a specific volume of pressurized gas, and if brought into fluid communication with the sealed chambers that contain the flexible substrate containers, they can instantly pressurize these. As mentioned, the chambers holding the substrate containers, also referred to as substrate chambers, may be sealed individually. Accordingly, it is also that a pressure reservoir chamber is provided individually for each substrate chamber. Any pipework leading from the pressure reservoir chamber towards the substrate chambers may be as short as possible and have a large enough diameter to enable rapid pressure equilibration. The use of gas pressure to force liquid substrates through a static mixing device as well as the use of pressure reservoir chambers for providing such gas pressure is also described in detail in the co-pending patent application EP 21206216.0, or in WO 2023/079039 A1, the full disclosures of which are incorporated herein by reference.

In a yet further aspect, the disclosure relates to a method, in particular a method for mixing or reacting two fluid substrates, which involves the use of the frame, the kit, the flexible container, or the apparatus as described hereinabove. In some non-limiting embodiments, such method is performed aseptically, i.e. using sterile substrates and pre-sterilized containers and product-contacting equipment components.

In a related aspect, the current disclosure also relates to a process of preparing an assembled frame, or to a process of preparing an assembled kit as described in any one or combination of their respective non-limiting embodiments described herein, for use in a method of mixing or reacting two liquid substrates, the process including at least the steps of:

a) filling of a first and a second flexible substrate container with a first and second liquid substrate, the first and second liquid substrate, for example, being different;
b) optionally, filing the flexible product container with a third liquid, such as a buffer; and
c) removing residual gas or air from the first and second flexible substrate containers;

wherein, in a further non-limiting embodiment, any one, or all of the steps a) to c) are performed aseptically, or under sterile, or clean room conditions.

In one non-limiting embodiment, at least steps a) and optionally b) of filling the containers are performed under aseptic conditions. The filling of the substrate containers as defined in step a) or optionally the product container of step b) may, in some non-limiting embodiments, be performed via an inlet port of said container connected to an aseptic disconnector such as described herein above.

Steps a) to c) may be performed on a fully-assembled frame including all the component parts (e.g. of or provided by the kit) required to perform the method of mixing. In a non-limiting embodiment, however, the process may include, preceding steps a) and optional step b) of filling the containers, a first step of assembling onto the frame, at least:

- a first and second flexible substrate container;
- a flexible product container
- a flexible waste container;
- a static mixing device; and
- one or more conduits, and optionally components arranged within the conduits such as a Y-piece and/or a T-piece, for fluidically connecting, for example but not limited to, an outlet port of the first substrate container with a first inlet port of the static mixing device, an outlet port of the second substrate container with a second inlet port of the static mixing device, and the outlet port of the static mixing device with the inlet port of the flexible waste container and the inlet port of the flexible product container; or
- any component parts of a kit as provided herein.

In a related non-limiting embodiment, a step of sterilizing the assembled kit may also be performed.

In one non-limiting embodiment, the frame is prepared for use according to the above process in its operating orientation. For example, any one or combination of the steps a) to c) may be performed when the frame is in its operating orientation, wherein the operating orientation may be a vertical operating orientation. In some non-limiting embodiments, step c) is performed when the frame is arranged in an apparatus adapted for receiving the assembled frame in its operating orientation. Said apparatus, in one non-limiting embodiment, may be the apparatus configured to function as a mixing station and for operating the frame in its assembled state.

In an alternative non-limiting embodiment, the frame is prepared for use with respect to steps a) to c) not while in its operating vertical orientation, but when the frame is at a tilted angle with respect to the vertical axis. In some non-limiting embodiments, any one or combination of steps a), b) or c); but, at least step c), may be performed when the frame is in a tilted position, for example with the top edge of the frame positioned at about an angle of at least 25°, 30°, 35, ° 40°, or 45°, or at an angle of at least between 25 to 45° away from the vertical axis of its operating orientation.

As described above, the present disclosure also provides for an apparatus which functions as a filling station. In one non-limiting embodiment, the apparatus may be adapted for receiving a fully assembled frame, and may be adapted, instead of, or in addition to holding the frame at its e.g. vertical operating orientation, be adapted to hold said frame in an angled position that is different from its operating orientation, for example as mentioned above, at an angle of between 25° to 45° away from the vertical axis.

Step c) may, for example, be performed by the exertion of a positive pressure or applying a negative pressure e.g. a vacuum to remove any residual gas (e.g. inert gas or air) in the flexible containers. For example, the removal of residual gas may be performed once the frame has been oriented in its operating orientation or another orientation for performing step c), such as at an angle as described above, by exerting an external pressure onto an external surface of the flexible container in an amount and/or duration sufficient to remove the residual gas from said container. In one non-limiting embodiment, the removal of residual gas from the respective first and second substrate container is conducted sequentially, i.e. not simultaneously. In some non-limiting embodiments, clamping means, for example a tube clamp may be employed to prevent premature flow of the liquid substrate from a flexible substrate bag to the static mixer while step d) is performed on the other flexible substrate bag. Clamping means may also be employed in between, or during any one of the steps in the above-described process and as required to prevent fluid flow, such as during transport of the assembled frame or assembly of the frame, and/or during residual gas or air removal of the flexible substrate containers.

In some non-limiting embodiments, the residual gas is removed and collected in the flexible waste container. In other non-limiting embodiments, depending on the setup of the assembled frame, the residual gas is removed not to the flexible waste or product containers but externally from the assembled frame for example via a port configured within or part of a conduit which is in fluid communication with an inlet port of the product or waste container.

In some non-limiting embodiments, the method includes the use of substrates which, upon mixing, result in an aqueous pharmaceutical composition including colloidal particles, such as nanoparticles including an active ingredient. For example, the nanoparticles may represent lipid nanoparticles (LNPs, as described above) carrying an active ingredient such as a nucleic acid (e.g. an mRNA) capable of expressing an antigen. In other words, the product obtained by mixing the first and the second substrate may be a pharmaceutical composition representing a vaccine.

Further liquid compositions that may be prepared by mixing two fluid substrates, under aseptic conditions, are generally known to the skilled person.

Furthermore, various features have been described above in the context of the frame, the kit and the components of the kit which should also be applied to the methods and processes as provided herein, as a skilled person would understand.

DETAILED DESCRIPTION OF THE DRAWINGS

FIG. 1 depicts a perspective view, not drawn to scale, of a frame (10) according to the present disclosure in its operating orientation, which is vertical, and parallel with a vertical axis (100). The frame includes a tray portion (15), which in the depicted non-limiting embodiment also forms the entirety of the frame. The frame simultaneously holds: (a) a first flexible substrate container (11), a second flexible substrate container (12), each including, respectively, an outlet port (91) and a sealed inlet port (92); (b) a flexible waste container (13) including an inlet port (93), (c) a flexible product container (14) including an inlet port (94) and a resealable outlet port (95); (d) a static mixing device (16) including a first inlet port (96) and a second inlet port (97) and an outlet port (98); and (e) a conduit (17*a*) for fluidically connecting the outlet port (91) of the first substrate container with the first inlet port (96) of the static mixing device; a conduit (17*b*) for fluidically connecting the outlet port (91) of the second substrate container (12) with the second inlet port (97) of the static mixing device (16), and conduits (17*c*, 17*d*, respectively) for fluidly connecting the outlet port (98) of the static mixing device (16) with the inlet ports (93, 94) of the product container (14) and the waste container (13). The frame (10) further includes a means (18) for holding a valve arranged within said conduits (17*c*, 17*d*).

The depicted frame (10) includes cavities (211, 212, 224, 225) shaped to hold each of the containers. The containers (11, 12, 13, 14) are each affixed to their respective cavities by a plurality of means (26) for affixing the containers. As exemplified in the current depiction, the means (26) for affixation are provided at up to four different locations (not all referenced, see also FIGS. 2, 3 and 4), with the affixation points located at the peripheral zones, or sealed edges of the containers, and at or near the four corners of the respective containers. It will be understood by the skilled person that the number of affixation points or means of affixation is not limited but may vary depending on, for example the type of means selected for affixing the containers, the container dimensions, and in some instances, also the operating orientation of the frame.

In the depicted non-limiting embodiment, the first cavity (211) is shaped to hold the first flexible substrate container (11), sealed inlet port (92), outlet port (91), and a conduit (17*a*) connecting the outlet port (91) of the container with the first inlet port (96) of the static mixing device (16), and the inlet port (96) of the static mixing device. The second cavity (212) is shaped to hold the second flexible substrate container (12), sealed inlet port (92), outlet port (91), and a conduit (17*b*) connecting the outlet port (91) of the second substrate container (12) with the second inlet port (97) of the static mixing device (16), and at least partially the second inlet port (96) of the static mixing device (16) itself. Said first cavity (211) and second cavity (212) also each include a circumferential gasket (19) which is adapted and shaped to the respective cavity, and which is used to form a seal on these cavities when an appropriate counterpiece or housing apparatus is applied thereupon. The cavity (224) for holding the flexible product container (14) is also shaped to accommodate at least part of the inlet port (94) of said container and of the resealable outlet port (95). The cavity (225) for holding the flexible waste container (13) is also shaped to accommodate at least part of the inlet port (93) of said container (13).

As depicted, the first and the second flexible substrate containers (11, 12) and the static mixing device (16) are held in the cavities (211, 212, 224, 225) in the tray portion (15) of the frame (10) in an arrangement such that a flow of fluid from the first and the second flexible substrate container (11, 12) to the static mixing device (16) occurs at least partially in an anti-gravity direction, and also from the static mixing device (16) to the waste (13) or product container (14) in at least partially in an anti-gravity direction. Moreover, the first cavity (211) and the second cavity (212) and the means for holding the static mixing device are arranged such that, in the operating orientation of the frame (10), the outlet ports (91) of both of the flexible substrate containers (11, 12) have an inferior position relative to the position of the respective inlet ports (96, 97) of the static mixing device (16).

Figure 2:
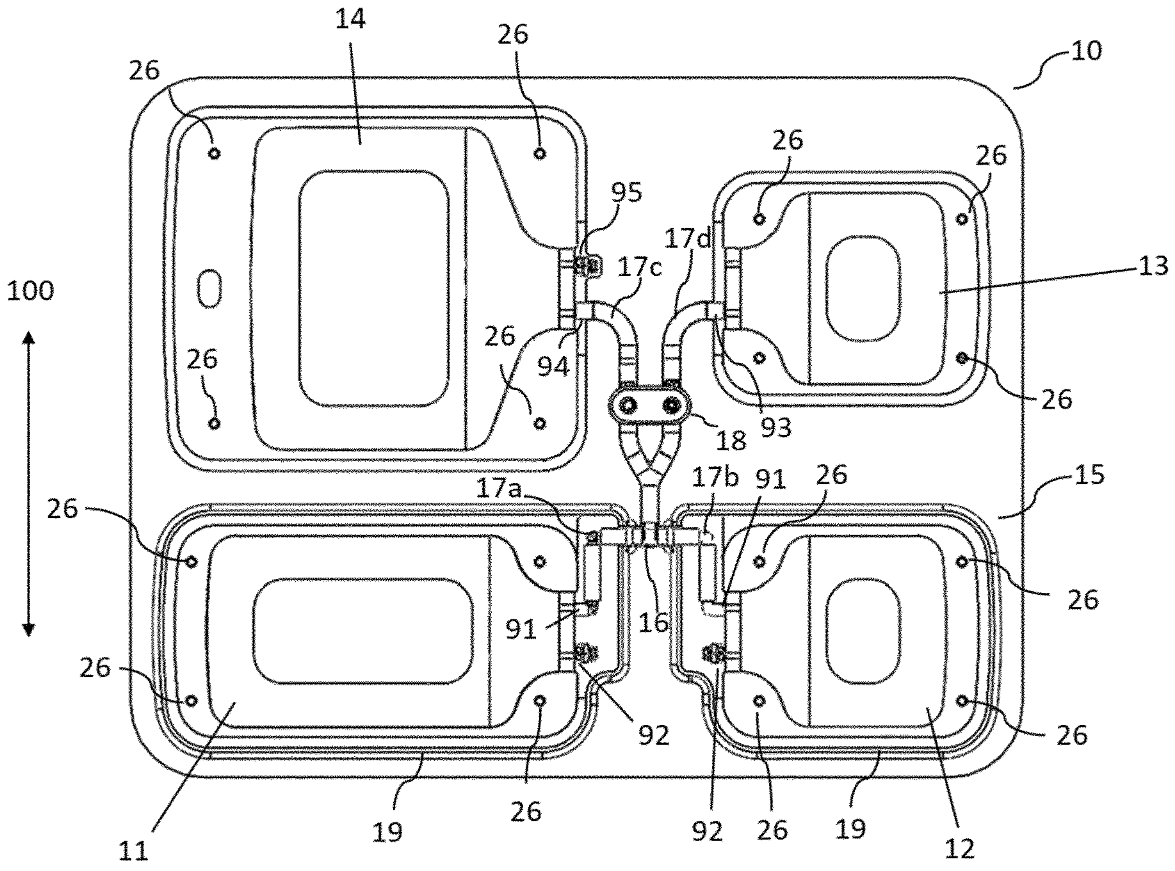
FIG. 2 is a front view of the frame (10) of FIG. 1.

FIG. 2 depicts a frontal view of the frame (10) of FIG. 1, also not drawn to scale, in its vertical operating orientation, parallel with a vertical axis (100), including a tray portion (15) holding the assembly of parts as described in FIG. 1. As illustrated, each cavity holding the first and second flexible substrate containers (11, 12) include, respectively, a gasket (19) circumferential around the cavity.

Figure 3:
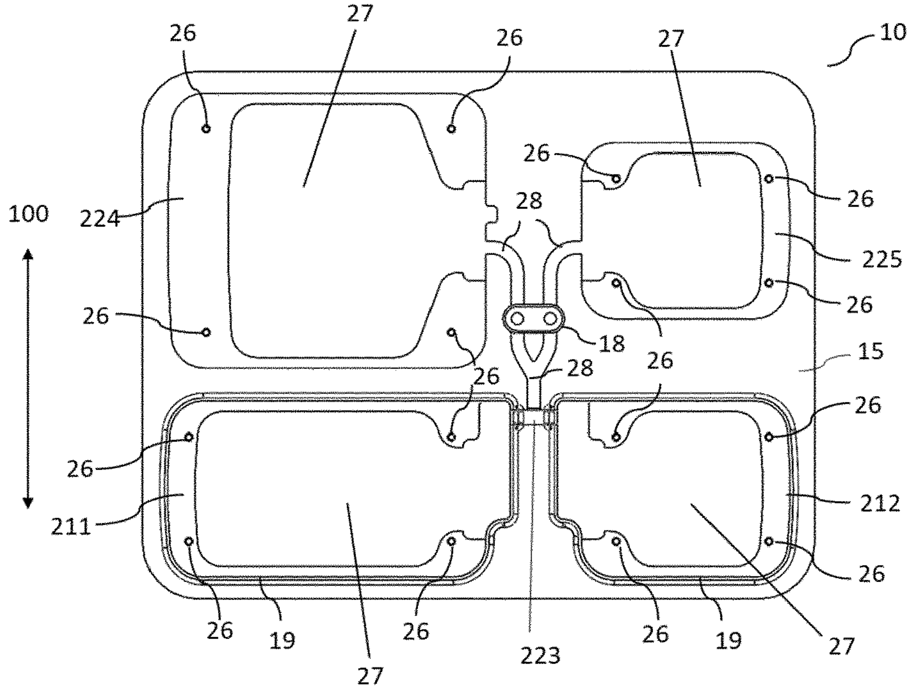
FIG. 3 depicts the front view of the frame (10) of FIG. 2 without its assembled parts.

FIG. 3 depicts the same frontal view of the frame (10), not drawn to scale, of FIG. 2 in its operating position, which is parallel to a vertical axis (100), but without any of the first and second flexible substrate containers, flexible waste and product containers, static mixing device, and conduits.

Figure 4:
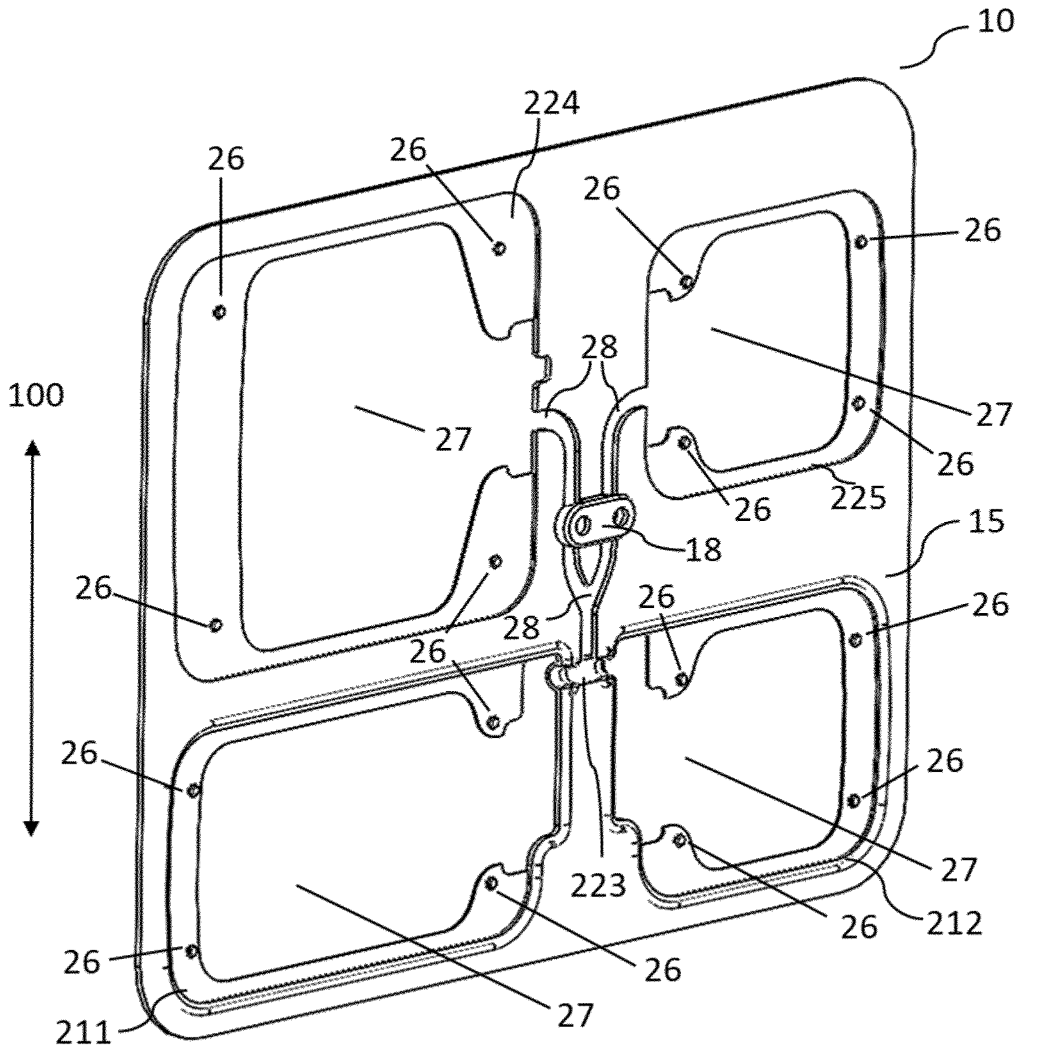
FIG. 4 is a perspective view of the frame (10) of FIG. 1 without its assembled parts

FIG. 4 depicts a perspective view of the frame (10) of FIG. 3, also not drawn to scale, in its operating orientation, but without any of the assembled first and second flexible substrate containers, flexible waste and product containers, static mixing device, and associated conduits.

Depicted in both FIGS. 3 and 4 is the frame (10) including a tray portion (15) including: a) a first cavity (211) shaped to hold the first flexible substrate container and its outlet and inlet ports, and the conduit for fluidly connecting the outlet port of said container to the first inlet port of the static mixer, and the first inlet port of the static mixing device; b) a second cavity (212) for holding the second flexible substrate container and its outlet and inlet ports, a conduit for fluidically connecting the outlet port of said container to the second inlet port of the static mixer, and the second inlet port of the static mixing device; and c) a means (223) for holding the static mixing device, wherein the means (223) is in the form of a recess in the tray portion (15), that is adapted to accommodate at least a portion, or partial profile of the static mixing device.

As depicted in the non-limiting embodiment in FIG. 3, each first and second cavities (211, 212) include, individually, a gasket (19) which is circumferential to said corresponding cavity, with a portion of the gasket of each of the respective cavities provided so as to be sealable against a portion of the static mixing device and against the respective inlet ports.

The cavities (211, 212, 224, 225) for holding the first and second flexible substrate containers and for holding the flexible product container and for holding the flexible waste container in the depicted non-limiting embodiment each include a through-hole (27), i.e. an opening in the cavity which is shaped to accommodate the respective containers and their associated features. The through-hole (27) of the first cavity (211) is shaped to accommodate at least part of the first flexible substrate container and its outlet and inlet ports, and the conduit for fluidly connecting the outlet port of said container to the first inlet port of the static mixer, and the first inlet port of the static mixer. The through-hole (27) of the second cavity (212) is shaped to accommodate at least part of the second flexible substrate container, its outlet and inlet ports, a conduit for fluidically connecting the outlet port of said container to the second inlet port of the static mixer. The through-holes (27) of the first and second cavities (211, 212) allow for individual pressurization by gas of each of these cavities when the respective cavities are enclosed following insertion of the frame (10) and tray portion (15) into a corresponding housing of an apparatus as described herein.

The cavity (224) for holding the flexible product container includes a through-hole (27) shaped to accommodate at least part of the flexible container and at least a part of, or the whole of the inlet port of said container, and resealable outlet port. The cavity (225) for holding the flexible waste container includes a through-hole (27) which is shaped to accommodate at least part of the flexible waste container, and at least a part of, or the whole of the inlet port of said container. The through-holes (27) provided in these cavities may be useful, to accommodate the fill volume of the flexible product container and/or flexible waste container when the tray and its assembled components are under operation in a method, for example, of preparing nanoparticles as described herein.

As illustrated in FIGS. 3 and 4, further provided are means (28) for holding the conduits, which in the depicted exemplification are through-holes shaped in the tray portion (15) of the frame (10) to hold or accommodate the conduits downstream of the outlet port of the static mixing device. The means (28) are adapted, for example, for holding conduits which are directly upstream to the inlet ports respectively of the flexible waste container and flexible product container, as well as for holding one or more conduits or conduit sections which are directly upstream of the outlet port of the static mixing device. As depicted, said means (28) adjoin the cavities (224, 225) for holding said containers, specifically the respective through-holes (27) of said cavity, and also the means (223) for holding the static mixing device, i.e. recess (223), with a portion of said means (28) also adjoining or traversing the means (18) for holding a valve.

FIGS. 3 and 4 also depict affixing means (26) for holding the containers. These may be, for example, but not limited to protrusion or pins in the cavities (211, 212, 224, 225) and are means which may be the same, or else matching or complementary to the means as shown in the assembled frame and on the flexible containers as depicted in FIGS. 1 and 2. As depicted, each cavity (211, 212, 224, 225) includes at least four means (26) or points for the affixation of the containers to the cavity.

Figure 5:
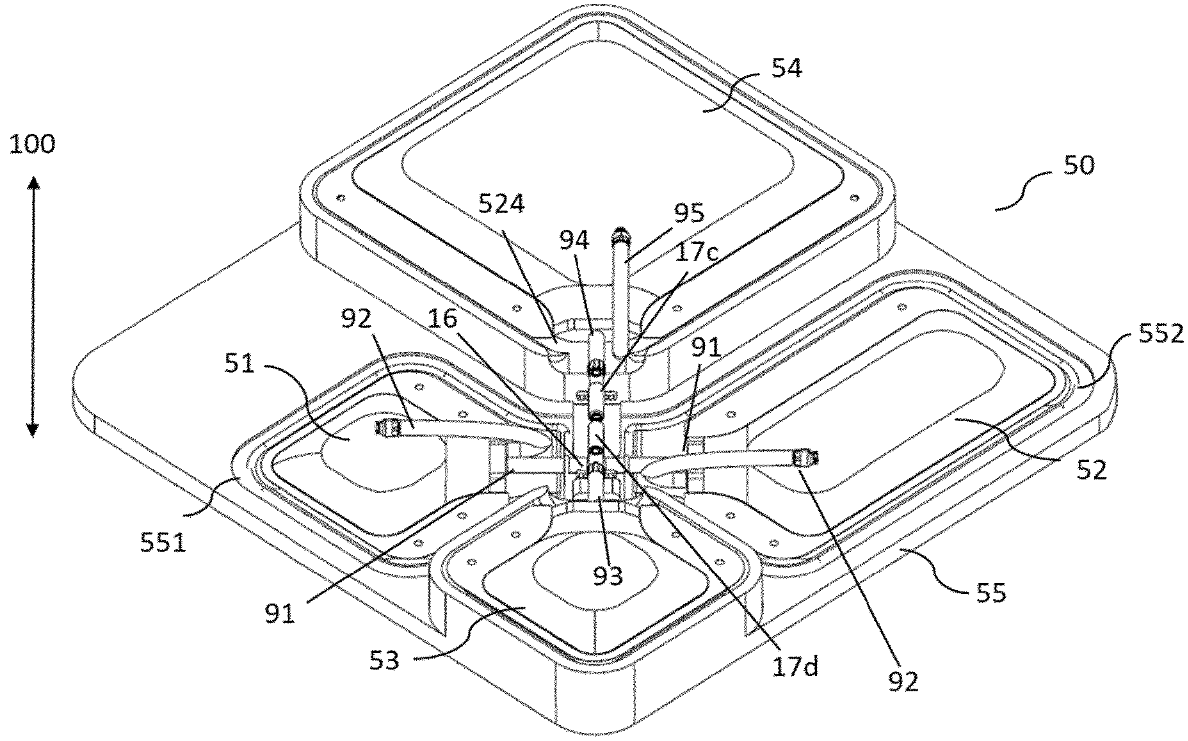
FIG. 5 depicts a perspective view a frame (50).

FIG. 5 depicts a perspective view, not drawn to scale, of another non-limiting embodiment of a frame (50) according to the present disclosure, with a horizontal operating orientation. In its horizontal operating orientation, the plane formed by two longer dimensions of the frame is perpendicular with respect to a vertical axis (100). The exemplified frame (50) includes a tray portion (55), which in the depiction forms substantially the entirety of the frame, said frame (50) simultaneously holding: (a) a first flexible substrate container (51), a second flexible substrate container (52), each including, respectively an outlet port (91) and a sealed inlet port (92); (b) a flexible waste container (53) including an inlet port (93), (c) a flexible product container (54) including an inlet port (94) and a resealable outlet port (95), (d) a static mixing device (16) including a first inlet port and a second inlet port and an outlet port (98); (e) conduits for fluidically connecting the outlet port (91) of the first substrate container (51) with the first inlet port of the static mixing device (16) and the outlet port (91) of the second substrate container (52) with the second inlet port of the static mixing device (16) (for further details, see view depicted in FIG. 6), and (f) conduits (17*c*, 17*d*, respectively) for fluidly connecting the outlet port of the static mixing device (16) with the inlet ports (94, 93) of the product container (54) and the waste container (53).

The depicted frame (50) includes cavities (551, 552, 524, 525, not all references shown, see also FIGS. 6 and 7) shaped to hold each of the containers. In the depicted non-limiting embodiment, the first cavity (511) is shaped to hold the first flexible substrate container (51), at least part of a sealed inlet port (92), the outlet port (91), and a conduit connecting the outlet port (91) of the container (51) with the first inlet port of the static mixing device (16), and the inlet port of the static mixing device (16) itself. The second cavity (552) is shaped to hold the second flexible substrate container (52), at least part of a sealed inlet port (92), outlet port, and a conduit connecting the outlet port of the second flexible container (52) with the second inlet port of the static mixing device (16), and the second inlet port of the static mixing device. The cavity (524) for holding the flexible product container (54) is also shaped to accommodate at least a part of the inlet port (94) of said container, and at least part of a resealable outlet port (95). The cavity (525) for holding the flexible waste container (53) is also shaped to accommodate at least part of the inlet port (93) of said container.

In this non-limiting embodiment of a frame (50) according to the present disclosure, the first and the second flexible substrate containers (51, 52) and the static mixing device (16) are held in the cavities (551, 552) in the tray portion (55) of the frame (50) in an arrangement such that in its horizontal operating orientation, a flow of fluid from the static mixing device (16) through its outlet port towards the waste or product containers (54, 53) occurs at least partially in an anti-gravity direction. Moreover, the first (551) and the second cavity (552) and the means for holding the static mixing device (16) are arranged on the tray portion (55) such that, the outlet ports (91) of both of the flexible substrate containers have, in relation to the vertical axis (100), an inferior position relative to the position of the respective inlet ports (93, 94) of the flexible waste container (53) and flexible product container (54).

Figure 6:
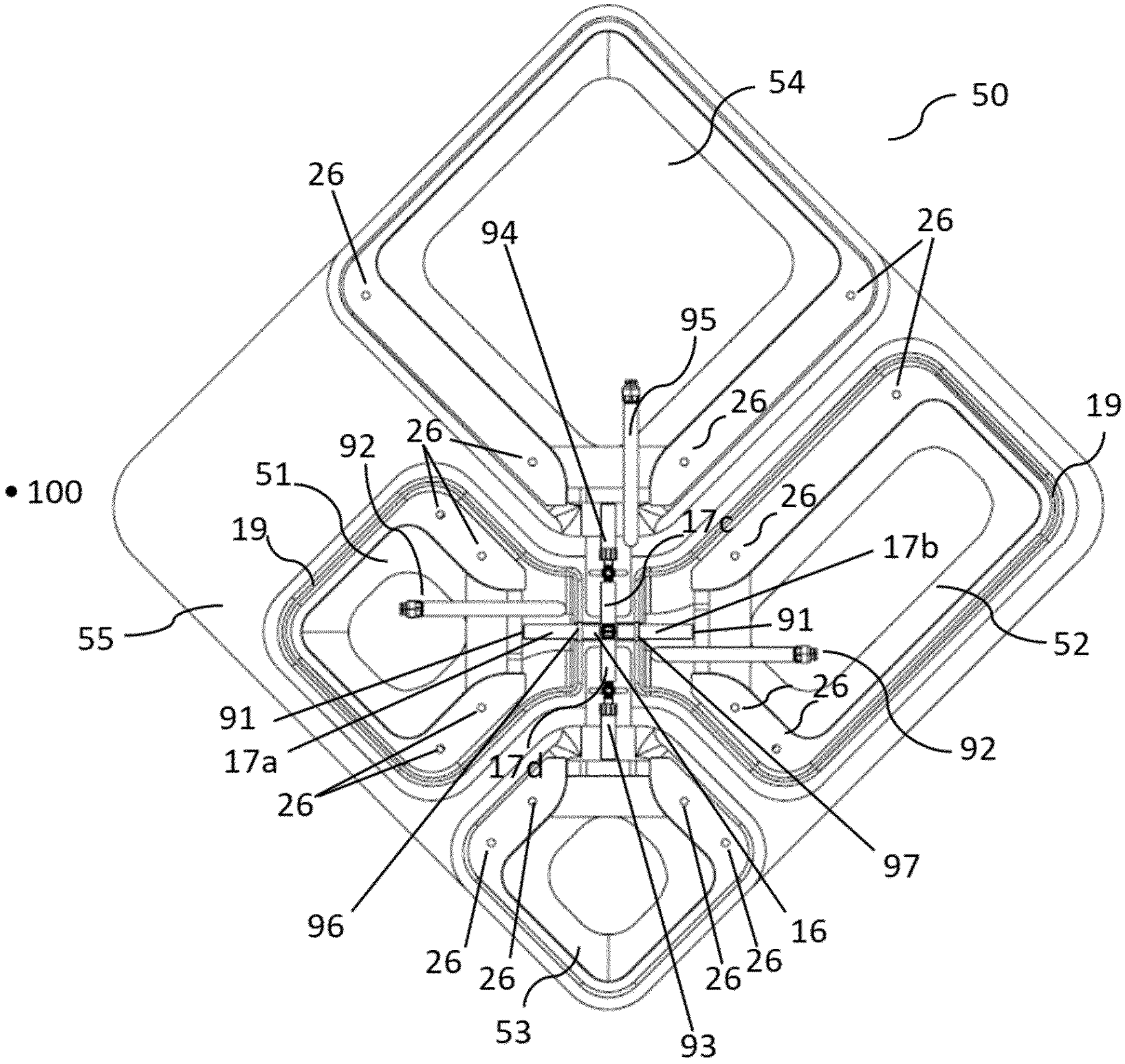
FIG. 6 depicts a top view of the frame (50) as shown in FIG. 5.

FIG. 6 is a top view (i.e. onto the vertical axis (100)) of the same frame (50) as described in FIG. 5. This view, also not drawn to scale, shows the circumferential gaskets (19) featured in the first cavity and second cavity (see also FIG. 7). Each of these gaskets (19) are each adapted and shaped to the respective cavity, and is used to form a seal on these cavities when an appropriate counterpiece apparatus is applied thereupon.

As shown and referenced in this depiction, the containers (51, 52, 53, 54) are each affixed to their respective cavities by a plurality of means (26) for affixing the containers. As exemplified in the current depiction, up to four means (26) for affixation are provided, with the affixation points located at the peripheral zones of the containers, on or near at least two corners of the sealed edge of the containers.

Figure 7:
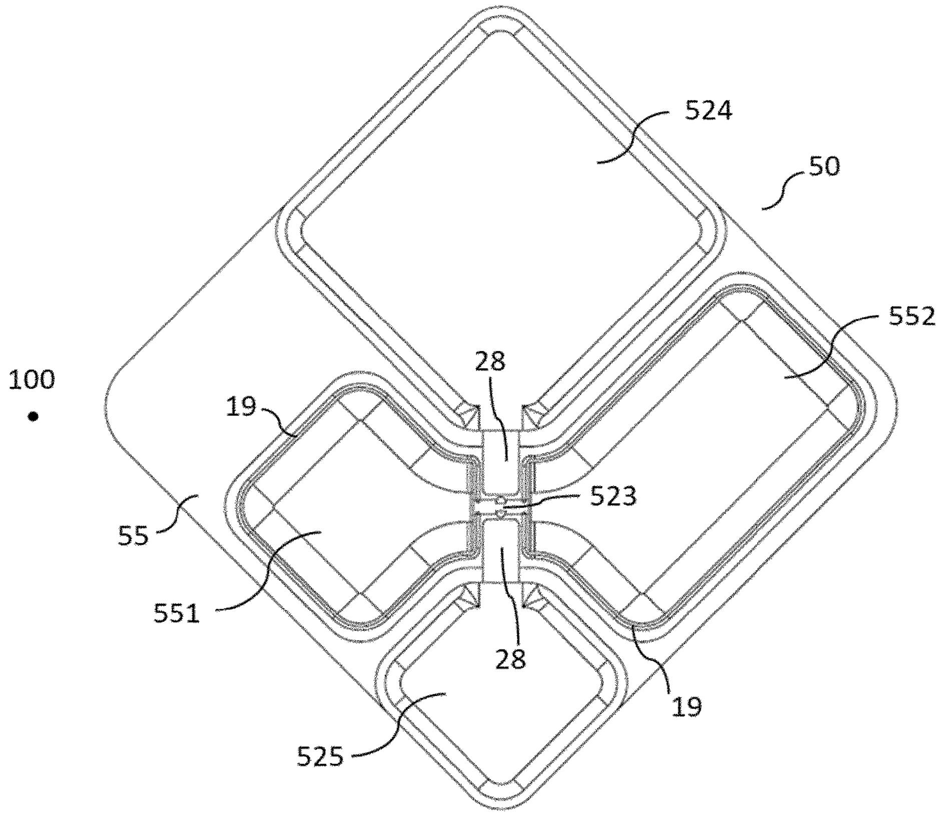
FIG. 7 is the top view of the frame (50) as shown in FIG. 6 without its assembled parts.

As further illustrated in this depiction, the first flexible substrate container (51) and the second flexible substrate container (52) are held respectively by the arrangement of the first cavity and second cavity on the tray portion (55) of the frame (50), such that the outlet port (91) of the first flexible substrate container (51) and outlet port (91) of the second flexible substrate container (52) are co-axially opposed (see also FIG. 7). In particular, the outlet port (91) of the first flexible substrate container (51) and outlet port (91) of the second flexible substrate container (52) are co-axially opposed at an angle of about 45° relative to a longitudinal central axis (not shown) of the frame (50). The conduits 17*a*, 17*b* for respectively fluidically connecting the outlet port (91) of the first substrate container (51) with the first inlet port (96) of the static mixing device (16), and for fluidically connecting the outlet port (91) of the second substrate container (52) with the second inlet port (97) of the static mixing device (16) are also substantially co-axially opposed.

Likewise, the flexible waste container (53) and the flexible product container (54) are held respectively by the arrangement of their corresponding cavities on the tray portion (55) of the frame (50), such that the respective inlet ports (93, 94) of these containers are also coaxially opposed (see also FIG. 7). The arrangement provided by the frame (50) also provides that at least a part, or a major portion (i.e. at least greater than 50% of the longitudinal length) of the conduits (17*c*, 17*d*) for fluidically connecting the outlet port (98) of the static mixing device (16) to respectively the flexible product container (54) and flexible waste container (53) are also co-axially opposed.

FIG. 7 depicts the same top view of the frame (50) and its tray portion (55) as described in FIG. 6, but without any of the assembled parts of the first and second flexible substrate containers, flexible waste and product containers, static mixing device, and their associated conduits. Depicted is the cavity (551) for holding the first flexible substrate container, the cavity (552) for holding the second flexible substrate container, the cavity (525) for holding the flexible waste container, and the cavity (524) for holding the flexible product container. Also depicted is a means (523) for holding the static mixing device, wherein the means (523) is a recess in the tray portion (55) of the frame (50). The recess adjoins the first cavity (551) and also the second cavity (552) and is adapted to hold the static mixing device such that flow of a fluid immediately exiting the outlet port of the static mixing device is in an anti-gravity direction. Each of the first and second cavities (551, 552) include, individually, a gasket (19) which is circumferential to said corresponding cavity, with a portion of the gasket of each of the respective cavities provided so as to be sealable against a portion of the static mixing device and against its respective inlet port. Further depicted are also means (28) for holding the conduits, specifically the conduits for fluidically connecting the outlet port of the static mixing device to respectively the flexible product container (54) and flexible waste container (53), which is also provided in the form of a recess in the tray (55) portion of the frame (50).

Figure 8:
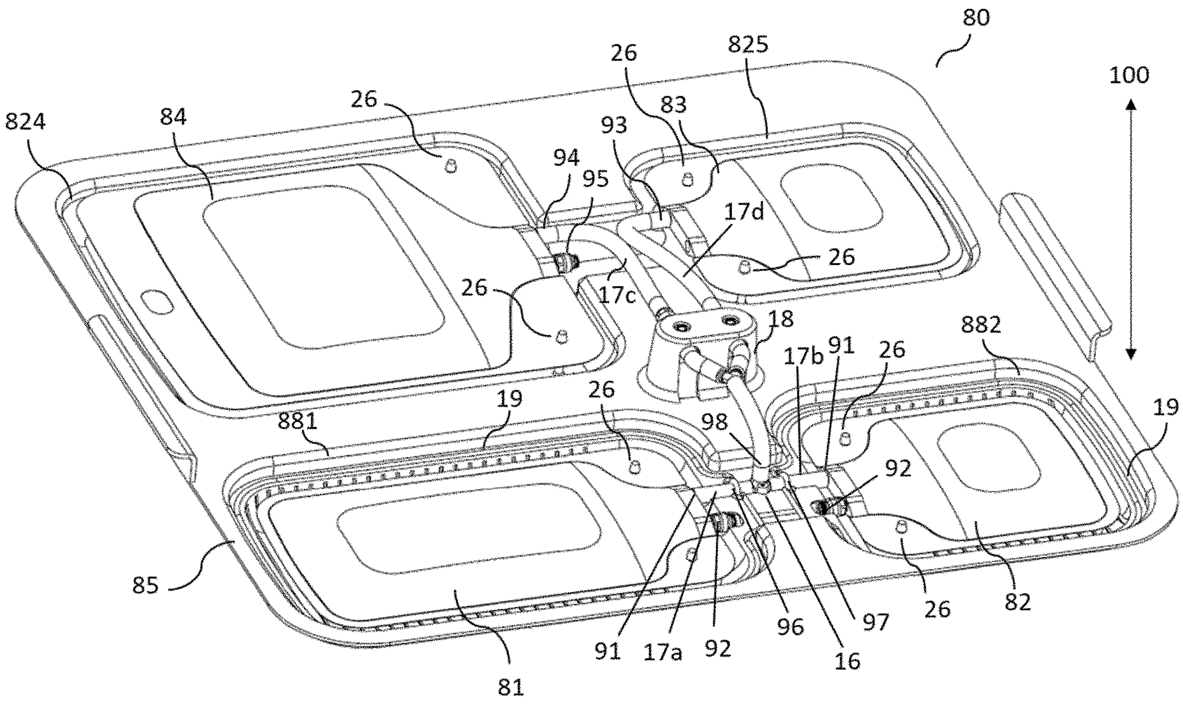
FIG. 8 depicts a perspective view of a frame (80).

FIG. 8 depicts a perspective view, not drawn to scale, of another non-limiting embodiment of a frame (80) according to the present disclosure, with a horizontal operating orientation. In its horizontal operating orientation, the plane formed by two longer dimensions of the frame (80) is perpendicular with respect to a vertical axis (100). The exemplified frame (80) includes a tray portion (85), which in the depiction forms substantially the entirety of the frame (80), said frame simultaneously holding: (a) a first flexible substrate container (81), a second flexible substrate container (82), each including, respectively an outlet port (91) and a sealed inlet port (92); (b) a flexible waste container (83) including an inlet port (93); (c) a flexible product container (84) including an inlet port (94) and a resealable outlet port (95); (d) a static mixing device (16) including a first inlet port (96) and a second inlet port (97) and an outlet port (98); and (e) conduits (17*a*, 17*b* respectively) for fluidically connecting the outlet port (91) of the first substrate container (81) with the first inlet port (96) of the static mixing device (16), the outlet port (91) of the second substrate container (82) with the second inlet port (97) of the static mixing device (16), and conduits (17*c*, 17*d*, respectively) for fluidly connecting the outlet port (98) of the static mixing device (16) with the inlet ports (94, 93) of the flexible product container (84) and the flexible waste container (83). The frame also includes a means (18) for holding a valve.

The depicted frame includes cavities (881, 882, 824, 825) shaped to hold each of the containers. In the depicted non-limiting embodiment, the first cavity (881) is shaped to hold the first flexible substrate container (81), its sealed inlet port (92), the outlet port (91), a conduit (17*a*,) connecting the outlet port of the first container with the first inlet port (96) of the static mixing device (16), and the inlet port (96) of the static mixing device (16). The second cavity (882) is shaped to hold the second flexible substrate container (82), its sealed inlet port (92), outlet port (91), a conduit (17*b*) connecting the outlet port of the second flexible container (82) with the second inlet port (97) of the static mixing device (16), and the second inlet port (97) of the static mixing device (16). Said first cavity (881) and second cavity (882) also each include a circumferential gasket (19) which is adapted and shaped to the respective cavity, and which is used to form a seal on these cavities when an appropriate counterpiece is applied thereupon. The cavity (824) for holding the flexible product container (84) is also shaped to accommodate said container (84), at least a part of the inlet port (94) of said container, and at least part of a resealable outlet port (95). The cavity (825) for holding the flexible waste container (83) is also shaped to accommodate at least part of the inlet port (93) of said container (83).

The containers (81, 82, 83, 84) are each affixed to their respective cavities by a plurality of means (26) for affixing the containers. As exemplified in the current depiction, the means (26) for affixation are provided at two locations (not all referenced, see also FIGS. 9, 10 and 11) on the containers at the peripheral zones, or sealed edges of the containers.

In this depicted non-limiting embodiment of a frame (80) according to the present disclosure, the first and the second flexible substrate containers (81, 82) and the static mixing device (16) are held in the cavities in the tray portion (85) of the frame (80) in an arrangement such that in its horizontal operating orientation, a flow of fluid from the static mixing device (16) from its outlet port (98) towards the waste or product containers (83, 84) occurs at least partially in an anti-gravity direction.

Figure 9:
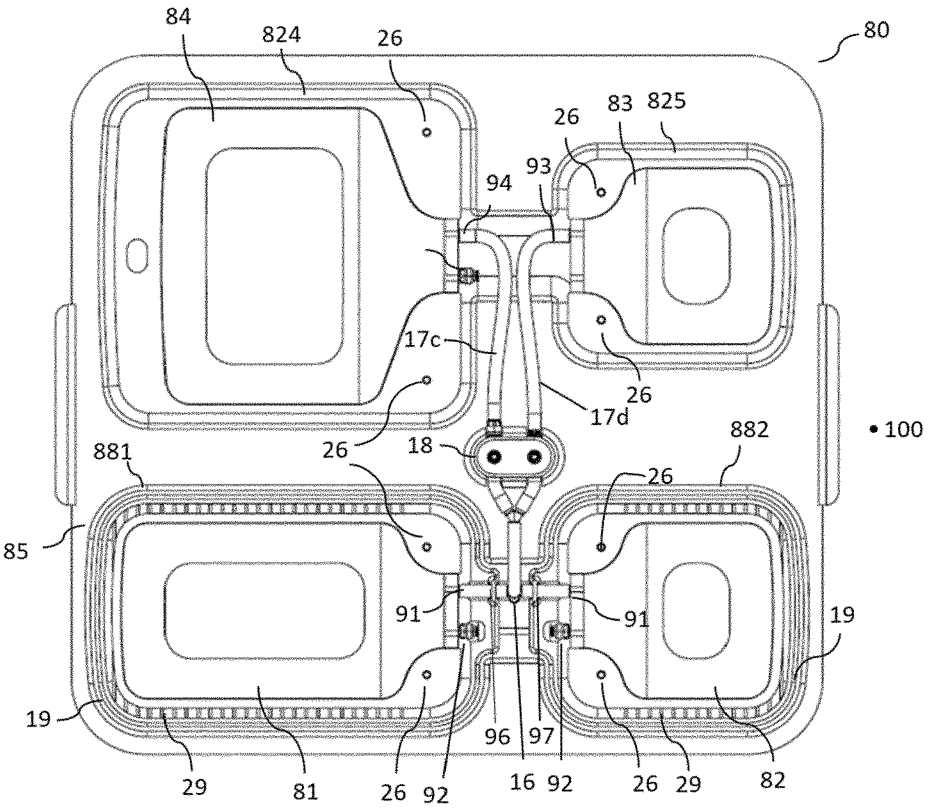
FIG. 9 is a top view of the frame (80) of FIG. 8.

FIG. 9 depicts a top view (i.e. onto the vertical axis (100)) of the same frame (80) as described in FIG. 8. This view, also not drawn to scale, shows the circumferential gaskets (19) which are comprised individually in the first cavity (881) and in the second cavity (882). Each of these gaskets (19) are each adapted to the respective cavity, and are used for forming a seal on these cavities when an appropriate counterpiece apparatus is applied thereupon.

As shown and referenced in this depiction, the containers (81, 82, 83, 84) are each affixed to their respective cavities by a plurality of means (26) for affixing the containers. As exemplified in the current depiction, two means for affixation (26) are provided per cavity, with the affixation points located at the peripheral zones of the containers, and proximal to the substrate container outlets (91) or product or waste container inlets (94, 93).

As further illustrated in this depiction, the first flexible substrate container (81) and second flexible substrate containers (82) are held respectively by the arrangement of the first cavity (881) and second cavity (882) on the tray portion (85) of the frame (80), such that the outlet port (91) of the first flexible substrate container (81) and outlet port (91) of the second flexible substrate container (82) are co-axially opposed. The conduits for respectively fluidically connecting the outlet port of the first substrate container (81) with the first inlet port (96) of the static mixing device (16), and for fluidically connecting the outlet port of the second substrate container (82) with the second inlet port (97) of the static mixing device (16) are also substantially co-axially opposed.

Figure 10:
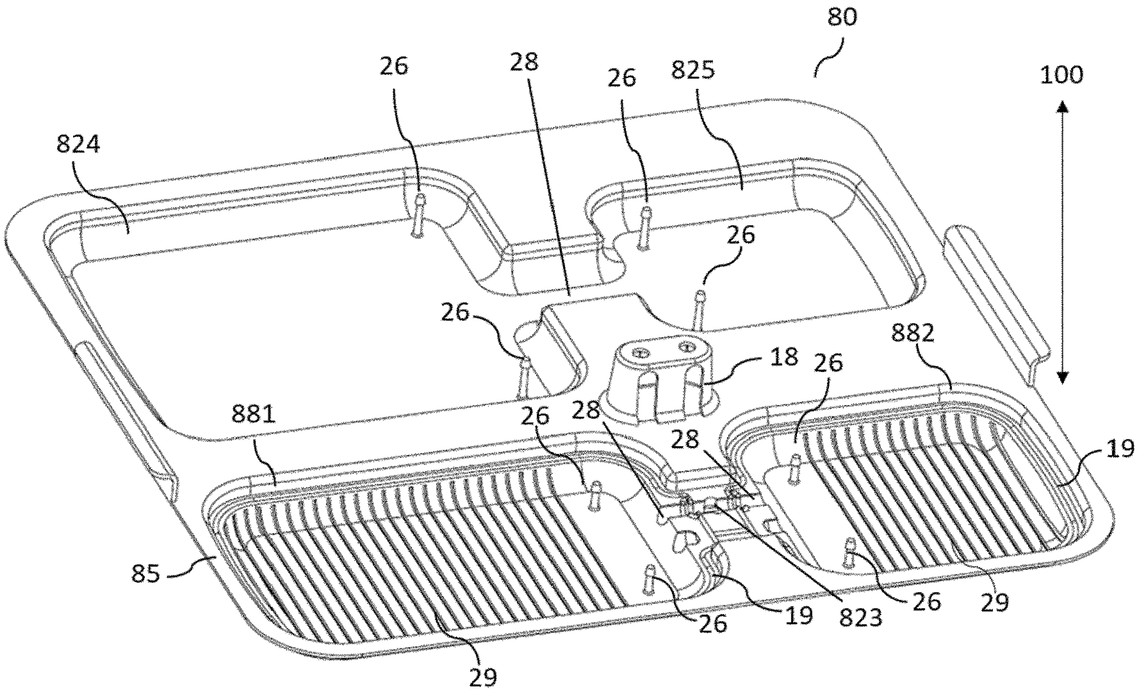
FIG. 10 depicts a perspective view of the frame (80) of FIG. 8 without its assembled parts.

FIG. 10 depicts the same perspective view of the frame (80), not drawn to scale, of FIG. 8 in its horizontal operating position in which the plane that is formed by the two longest dimensions of the frame that is perpendicular to a vertical axis (100), but without any of the first and second flexible substrate containers, flexible waste and product containers, static mixing device, and associated conduits.

Figure 11:
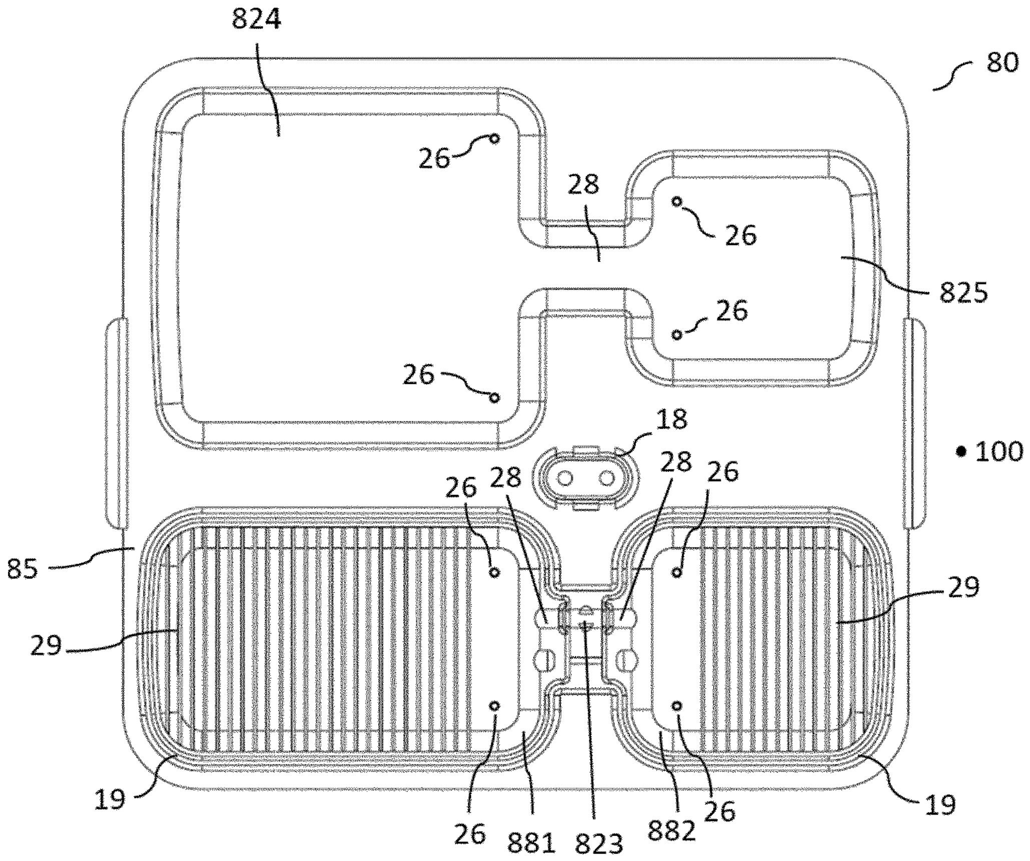
FIG. 11 is a top view of the frame (80) of FIG. 9 without its assembled parts.

FIG. 11 depicts the same top view of the frame (80) as in FIG. 9, also not drawn to scale but without any of the assembled first and second flexible substrate containers, flexible waste and product containers, static mixing device, and associated conduits.

Depicted in both FIGS. 10 and 11 is the exemplified frame (80) including a tray portion (85) including: a) a first cavity (881) shaped to hold the first flexible substrate container and at least part of its outlet port and sealed inlet port, and the conduit for fluidly connecting the outlet port of said container to the first inlet port of the static mixer, and the first inlet port of the static mixing device; b) a second cavity (882) for holding the second flexible substrate container, at least part of its outlet port and sealed inlet port, a conduit for fluidically connecting the outlet port of said container to the second inlet port of the static mixing device, and the second inlet port of the static mixing device; and c) a means (823) for holding the static mixing device, wherein the means is a recess in the tray portion (85), that is adapted to accommodate at least a portion, or partial profile of the static mixing device, and adapted to hold said device in an arrangement such that in conjunction with the operating orientation of the frame (80), the flow of a fluid immediately exiting the outlet port of the mixing device is at least partially in an anti-gravity direction. In the unassembled state of the frame (80), i.e. in the absence of the substrate containers and the mixing device, said recess (823) is furthermore in in fluid communication with the first cavity (881) and in fluid communication with the second cavity (882).

As depicted in FIGS. 10 and 11, the first and second cavities include, individually, a gasket (19) which is circumferential to said corresponding cavity, with a portion of the gasket of each of the respective cavities provided so as to be sealable against a portion of the static mixing device and against its respective inlet ports.

As illustrated in FIGS. 10 and 11, further provided are means (28) for holding, or partially holding the conduits. The means (28) for holding the conduits for fluidically connecting the first and second containers with the inlet port of the static mixing device are provided as a recess in the tray portion (85). The means (28) which are adapted for holding at least partially the conduits which are directly upstream to the inlet ports respectively of the flexible waste container and flexible product container is also provided in the form of a recess in the tray portion (85). The means (18) for holding a valve may also further include means for holding a conduit downstream from the outlet port of the static mixing device.

FIGS. 10 and 11 also depict affixing means (26) for holding the containers. As shown in FIG. 10, the cavities (881, 882, 824 and 825) include arrow- or mushroom-headed protrusions, or barbed pins or plugs, which are adapted for receiving a flexible container having through-holes which are positioned to match said protrusions (for reference, see corresponding location of affixation means in FIGS. 8 and 9 showing frame and assembled with the flexible containers).

The cavity (881) for holding the first flexible substrate container and the cavity (882) for holding the second flexible substate container further include a gas pressure distribution means (29). When said cavity is enclosed by a counterpiece apparatus and the means for forcing the liquid substrates to flow from the first and the second flexible substrate container into the static mixing device is provided in the form of pressurized gas (e.g. pressurized air), said means may be useful for uniform distribution of the air flow across the cavity and onto the flexible containers. The gas pressure distribution means (29) may be provided as a series of vents, which is adapted to the shape of the cavity onto which the flexible substrate containers may be placed. In an alternative non-limiting embodiment, the cavities (881, 882) include a plurality of laterally arranged through-holes, e.g. in the form of slits or vents which allow pressurized air to enter into the cavity in a diffused manner.

Figure 12:
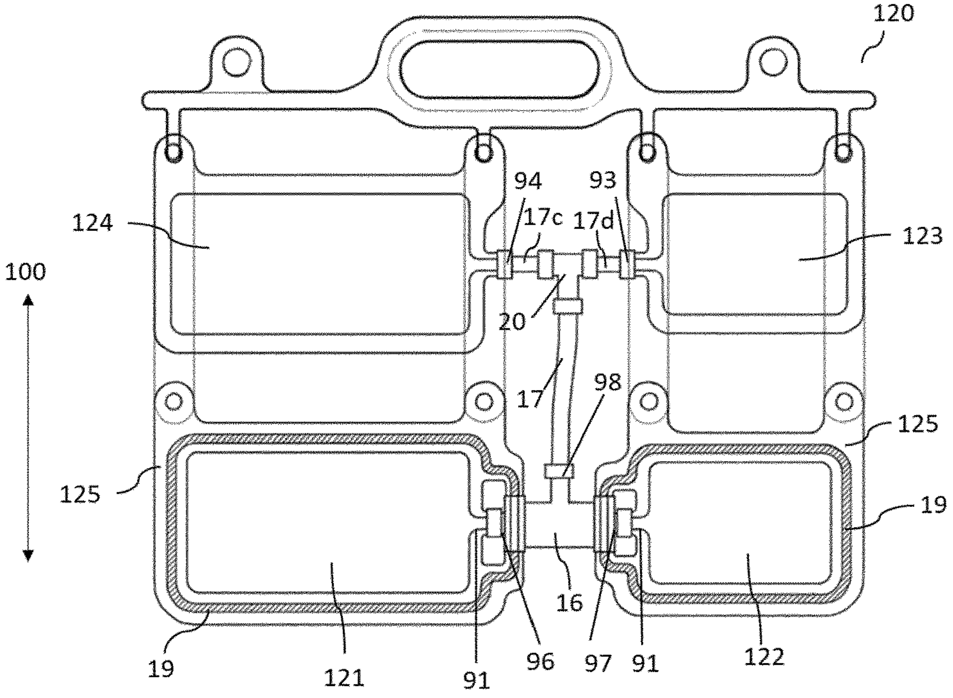
FIG. 12 depicts a front view of a frame (120).

FIG. 12 depicts a front view of another example of a frame (120), not drawn to scale, according to the present disclosure. The frame (120) is shown in its operating orientation, which is vertical, and parallel with a vertical axis (100). The frame (120) includes a tray portion (125) simultaneously holding a first flexible substrate container (121), a second flexible substrate container (122), each substrate container including, respectively, an outlet port (91); and a static mixing device (16) including a first inlet port (96), a second inlet port (97) and an outlet port (98). The depicted frame (120) further simultaneously holds a flexible waste container (123) including an inlet port (93), a flexible product container (124) including an inlet port (94), conduits (17, 17*c*, 17*d*) for fluidly connecting the outlet port (98) of the static mixing device (16) with the inlet ports (94, 93) of the product container (124) and the waste container (123), and a valve (20) arranged with the conduits (17, 17*c*, 17*d*) for directing the fluid flow from the outlet port (98) of the static mixing device (16) to the inlet port (93) of the waste container (123), or to the inlet port (94) of the product container (124). A circumferential gasket (19) is provided for each of the first and second cavities which may be used to form a seal on these cavities when an appropriate counterpiece is applied thereupon.

As depicted, the first and the second flexible substrate containers (121, 122) and the static mixing device (16) are held in the cavities in the tray portion (125) of the frame (120) in an arrangement such that in its depicted operation orientation, a flow of fluid from the outlet (98) of the static mixing device (16) to the waste or product container (123, 124) occurs in at least partially in an anti-gravity direction. The frame (120) may in some non-limiting embodiments be arranged so as to be reversibly affixable to an apparatus such as defined herein, for example, an apparatus for filling of the substrate containers. The frame (120) in relation to its operating orientation is also arranged such that, the outlet ports (91) of both of the flexible substrate containers have, in relation to the vertical axis (100), an inferior position relative to the position of the respective inlet ports (93, 94) of the flexible waste container (53) and flexible product container (54).

Figure 13:
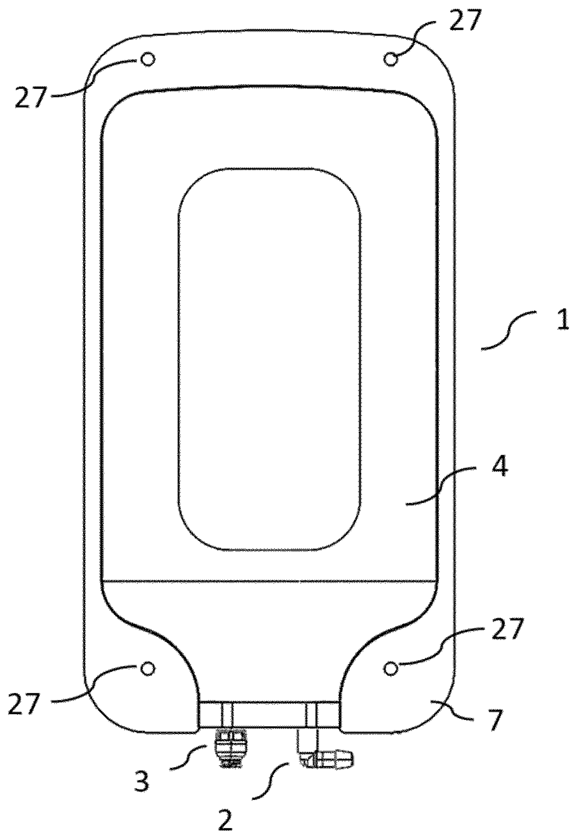
FIG. 13 depicts an example of a flexible container (1).

FIG. 13 depicts an example of a flexible container (1) for use with a frame or tray portion of a frame, or apparatus, or provided as part of a kit, according to any one of the non-limiting embodiments or combination of non-limiting embodiments described in the present disclosure. Said flexible container (1) may be useful as a flexible substrate container, a flexible waste container or a flexible product container, and is adapted to be reversibly held in a corresponding cavity in the frame. The flexible container includes at least one inlet or outlet port (2) and in the present non-limiting embodiment, a sealable port (3), which may be sealed depending on the function of the container or its use status, such as in a method of use of the frame or apparatus as described herein.

In the depicted non-limiting embodiment, the flexible container includes an internal space (4) for holding a fluid material surrounded by a flexible wall formed by a front and a back wall made of a polymeric material, wherein the flexible front wall and the flexible back wall are connected to one another such as to form a sealed edge (7) substantially surrounding the internal space (4), wherein the edge (7) includes four corner regions, wherein a through-hole (27) is provided in or near a first corner region and a through-hole (27) is provided in or near a second corner region of the sealed edge (7), and wherein the second corner region is adjacent to the first corner region. In the presently depicted exemplification, the flexible container includes a through-hole (27) at each corner region, which are positioned to match the positions of corresponding affixation or holding means provided in a corresponding cavity in a frame or tray portion of the frame according to the present disclosure.

Figure 14:
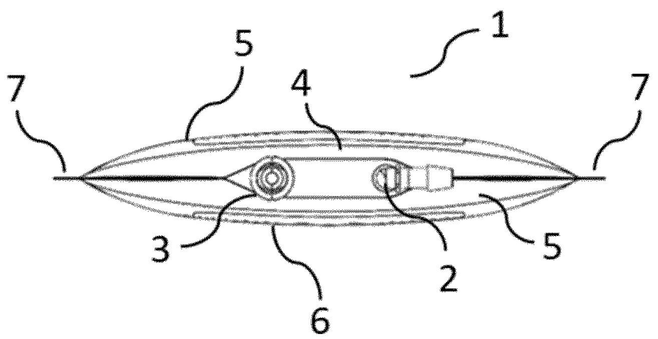
FIG. 14 depicts a perspective side view of the flexible container (1) of FIG. 13.

FIG. 14 is a perspective side view of the flexible container (1) of FIG. 13, depicting the end of the container including the ports (2, 3), which are in fluid communication with an internal space (4) for holding a fluid material, said space being formed by a flexible front wall (5) and flexible back wall (6), each wall being connected to form a continuous sealed edge (7).

Figure 15:
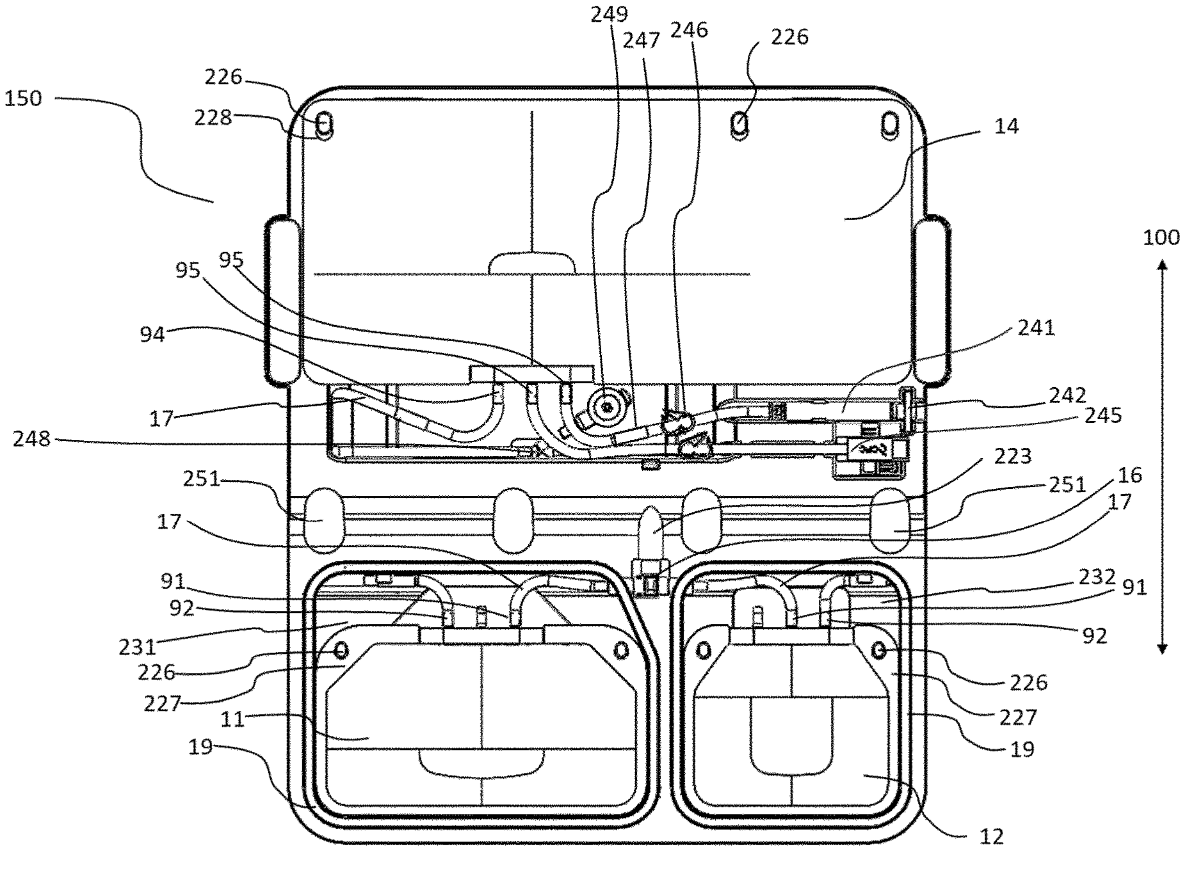
FIG. 15 depicts a frontal view of a front side, or user-facing side, of another example of a frame (150) with its assembled parts.

FIG. 15 depicts a frontal view of a front side, or user-facing side, of another example of a frame (150) according to the present disclosure, not drawn to scale. The frame (150) is shown in its operating orientation, which is vertical, and parallel with a vertical axis (100). As the frame (150) is assembled and holds the flexible containers (11, 12, 14), conduits (17) and the static mixing device (16), the Figure also depicts an example of a kit according to the present disclosure. The frame (150) includes a first (231) and second (232) sealable region for holding a first and a second flexible substrate container (11, 12). The sealable regions (231, 232) are defined by circumferential gaskets (19). The sealable regions (231, 232) are positioned to be adjacent to one another. Even though not drawn to scale, it can be seen that the first sealable region (231) is larger than the second (232), and that the size difference is reflected in that the sealable regions (231, 232) have the same height, but the width of the first sealable region (231) is larger than that of the second sealable region (232). Within the sealable regions (231, 232) of the frame (150), the first and second flexible substrate container (11, 12) are held by means (226) for affixing them in their designated position. The means (226) are connectable with corresponding through-holes (cf. 228) in the peripheral zone or sealed edge (227) of the respective flexible container. Each substrate container (11, 12) has three ports, including an outlet port (91) and a sealed inlet port (92). The outlet ports (91) are fluidically connected via conduits (17) with a static mixing device (16), which is held in place by a means (223) for holding it. Moreover, the outlet ports (91) are arranged at the top of the substrate containers (11, 12) such that the fluid substrates or liquids (not shown) held therein would exit the substrate containers (11, 12) in an anti-gravity direction in order to flow to the static mixing device (16). Also shown is a flexible product container (14) arranged on the front side and towards the top of the frame (150), held by three affixing means (226) whose positions correspond with three through-holes (228) provided in a peripheral zone of the product container (14). It is noted that the flexible waste container cannot be seen as it is affixed to the back side of the frame (see FIG. 16). The product container (14) has three ports arranged at its bottom side (in its operating orientation) including an inlet port (94) for receiving the third fluid from the static mixing device (16) via a conduit (17), and two outlet ports (95). One of the outlet ports (95) is fluidically connected via a flexible tube to a sampling tube (241), whose downstream end is fluidically connected with a sterile filter (242); upstream of the sampling tube (241), a pinch valve (246) and an aseptic disconnector (247) are arranged for facilitating the withdrawal of a product sample. The other outlet port (95) is fluidically connected via a flexible tube to an aseptic connector (245). Also shown is a further sterile filter (249) which is in fluidic connection with the inlet port of the product container via a Y-piece (248). This arrangement may be used for adding diluent before, during or after the mixing process to the product container (14) such as to dilute or change the composition of the third fluid received from the static mixing device (16). Another advantageous use is to inject just enough diluent or sterile air as necessary to push any remaining (third) fluid present in the conduit (17) between the Y-piece (248) and the inlet port (94) into the product container (14) such as to maximize the yield of the mixing process. The frame (150) further includes four through-holes (251) in a central region that enable it to be affixed to an apparatus for operating the frame (150) or the kit.

Figure 16:
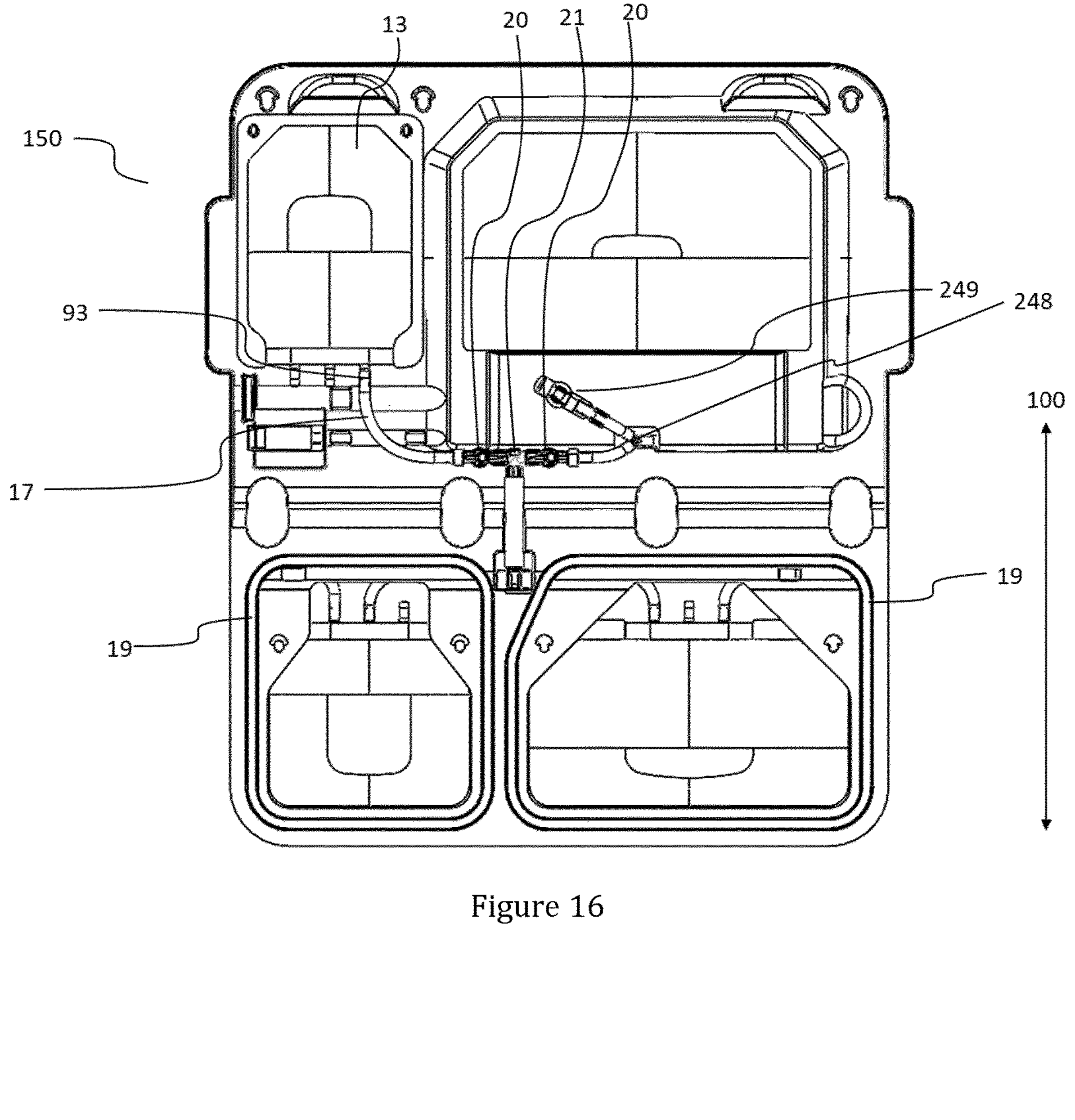
FIG. 16 depicts a frontal view of the back side of the frame (150) as depicted in FIG. 15.

FIG. 16 depicts a frontal view of the back side of the same frame (150) or kit as shown in FIG. 15, also shown in its operating orientation, which is vertical, and parallel with a vertical axis (100). Here, the flexible waste container (13) which is affixed to the back side of the frame can be seen. In the operating orientation, the bottom side of the waste container (13) exhibits three ports, including an inlet port (93) which is fluidically connected via a conduit (17) to a valve (20) which is a one-way stopcock valve. The valve (20) is arranged downstream of a T-piece (21) through which the third fluid is received from the static mixing device. The T-piece (21) whose inlet is fluidically connected with the static mixing device has a second outlet downstream of which another valve (20), which is also a one-way stopcock valve which is arranged and fluidly connected to a Y-piece (248), the Y piece being fluidly connected to a sterile filter (249) and fluidically connected with the flexible product container that is affixed to the front side of the frame (150) (see FIG. 15). Moreover, circumferential gaskets (19) encircling the through-holes (27) are arranged also on the back side of the frame (150), similar to the front side (as shown in FIG. 15).

Figure 17:
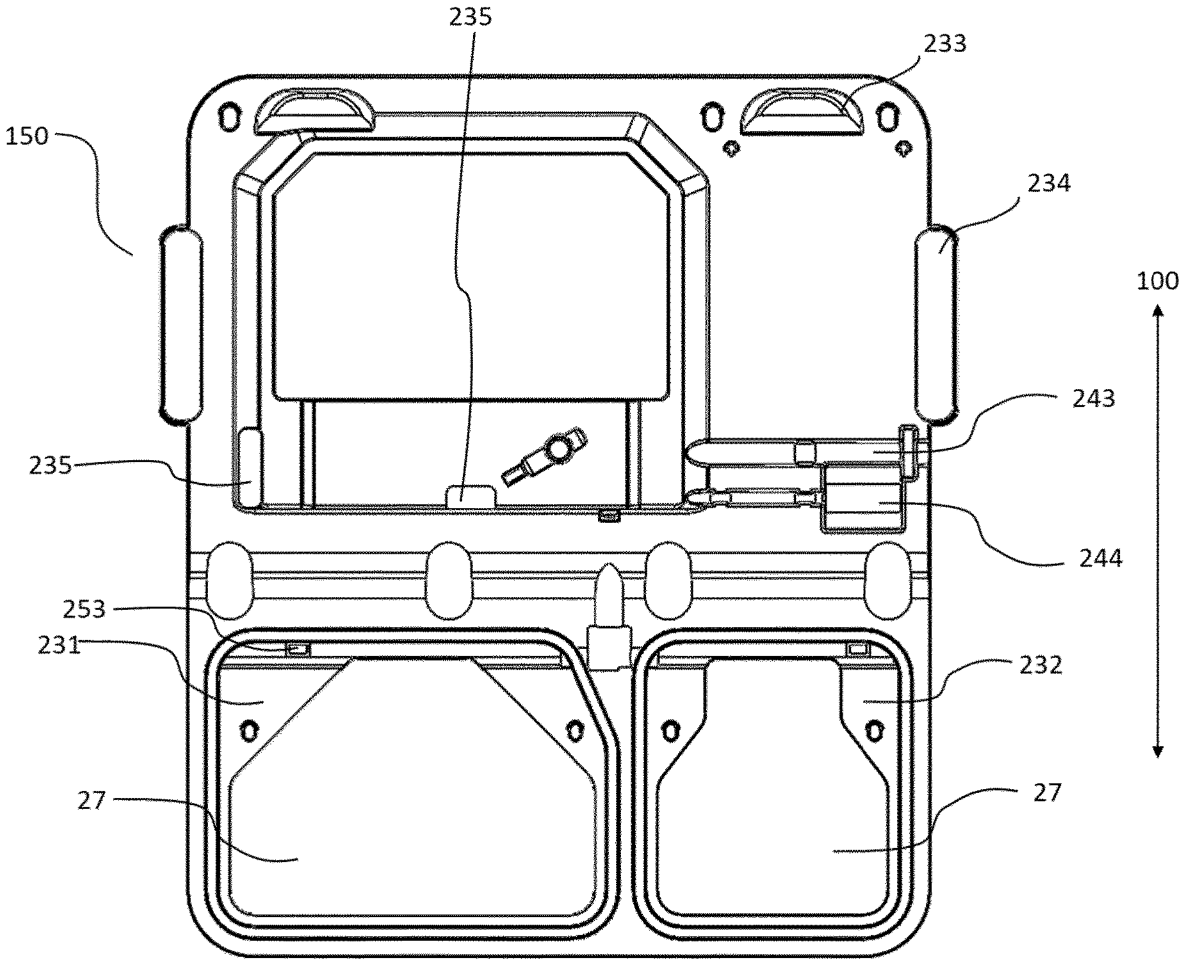
FIG. 17 depicts a frontal view of the front side of the frame (150) as shown in FIG. 15 without its assembled parts.

FIG. 17 depicts a frontal view of the front side of the frame (150) shown in FIG. 15, in its operating orientation which is vertical (parallel with a vertical axis (100)), except that the flexible container, conduits, the static mixing device, or any other components defining the flow path of any of the first, second or third liquid, such as T- or Y-pieces, valves or filters, are absent. In other words, it is a depiction of an exemplary frame (150) before it is assembled into a kit according to some non-limiting embodiments disclosed herein. Prominently shown are the through-holes (27) in the first and second sealable region (231, 232) through which a pressurized gas may be supplied in the operating state such as to exert pressure on external surfaces of the first and second flexible substrate bag. Also shown are depressions (243, 244) for holding the sampling tube and sterile filter associated therewith and the aseptic connector, respectively. The frame (150) further includes means (233) for affixing the frame to external holding means, such as hooks, e.g. to assist the user in correctly positioning the frame (150) to any corresponding holding means that may be provided, for example, by an apparatus for filling the flexible substrate containers when affixed to the frame (150) or an apparatus to operate the fully assembled frame (150) or kit. Grips or handles (234) are provided such that a user can hold and position the frame (150) easily. Various small openings or through-holes (235) are depicted which hold conduits or allow conduits to connect the front and the back side of the frame (150). In the sealable regions (231, 232), means (253) are provided for affixing or holding at least one conduit to the frame, or more specifically, for holding the conduit within the sealable region. Said one or more conduits may, for example, be associated with the container inlet port (e.g. crimped tube endings) and the means (253) may, in some non-limiting embodiments, be a hook.

Figure 18:
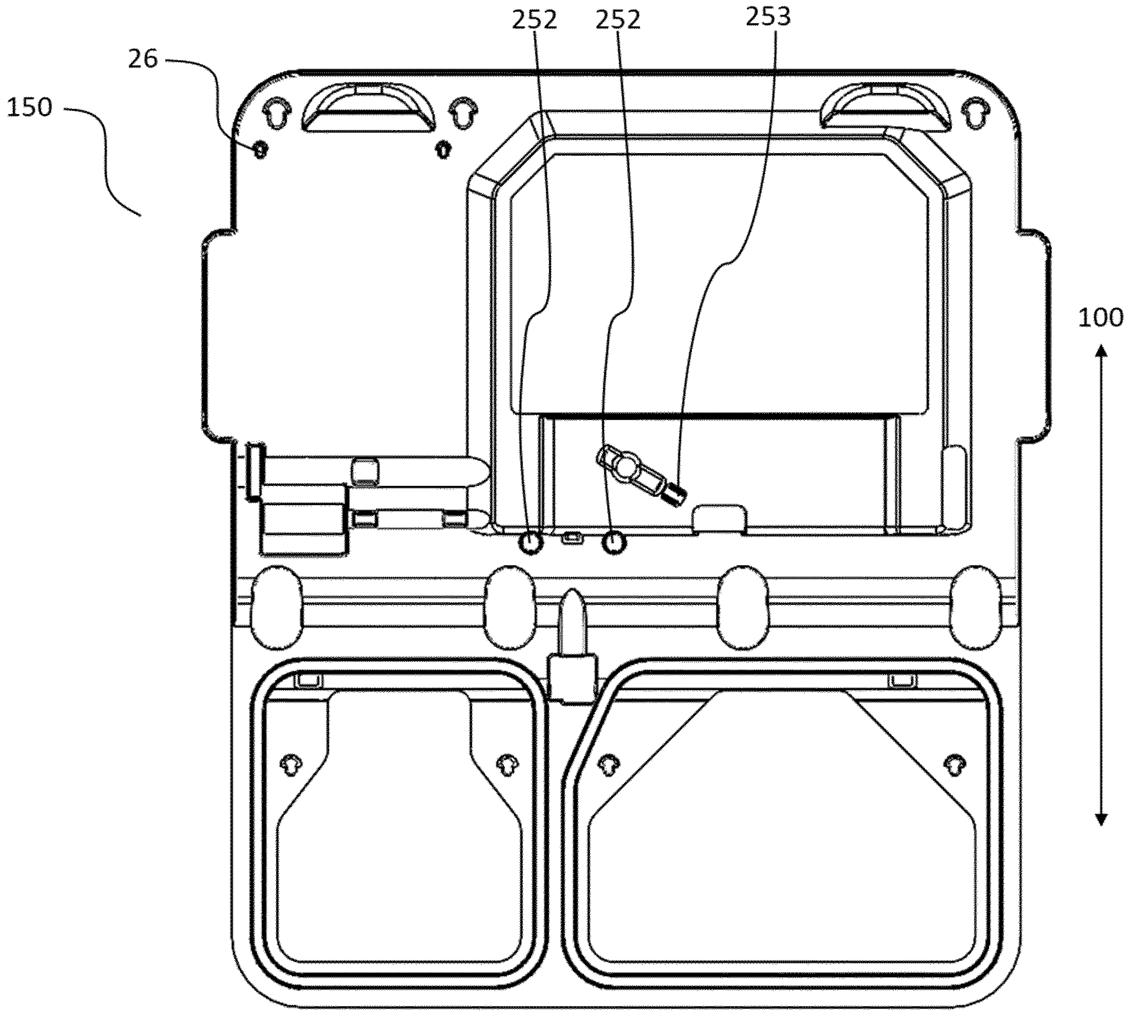
FIG. 18 depicts a frontal view of the back side of the frame (150) as shown in FIG. 17.

FIG. 18 depicts a frontal view of the back side of the frame (150) shown in FIG. 17 and in its operating orientation parallel to a vertical axis (100). As shown, the affixation or fastening means (26) for the flexible waste container are provided on the back side of the frame (150). Moreover, two means (252) are provided for affixing or holding the valves (20) as described in FIG. 16. Also shown is a means for affixing a conduit (253) to the frame.

Figure 19:
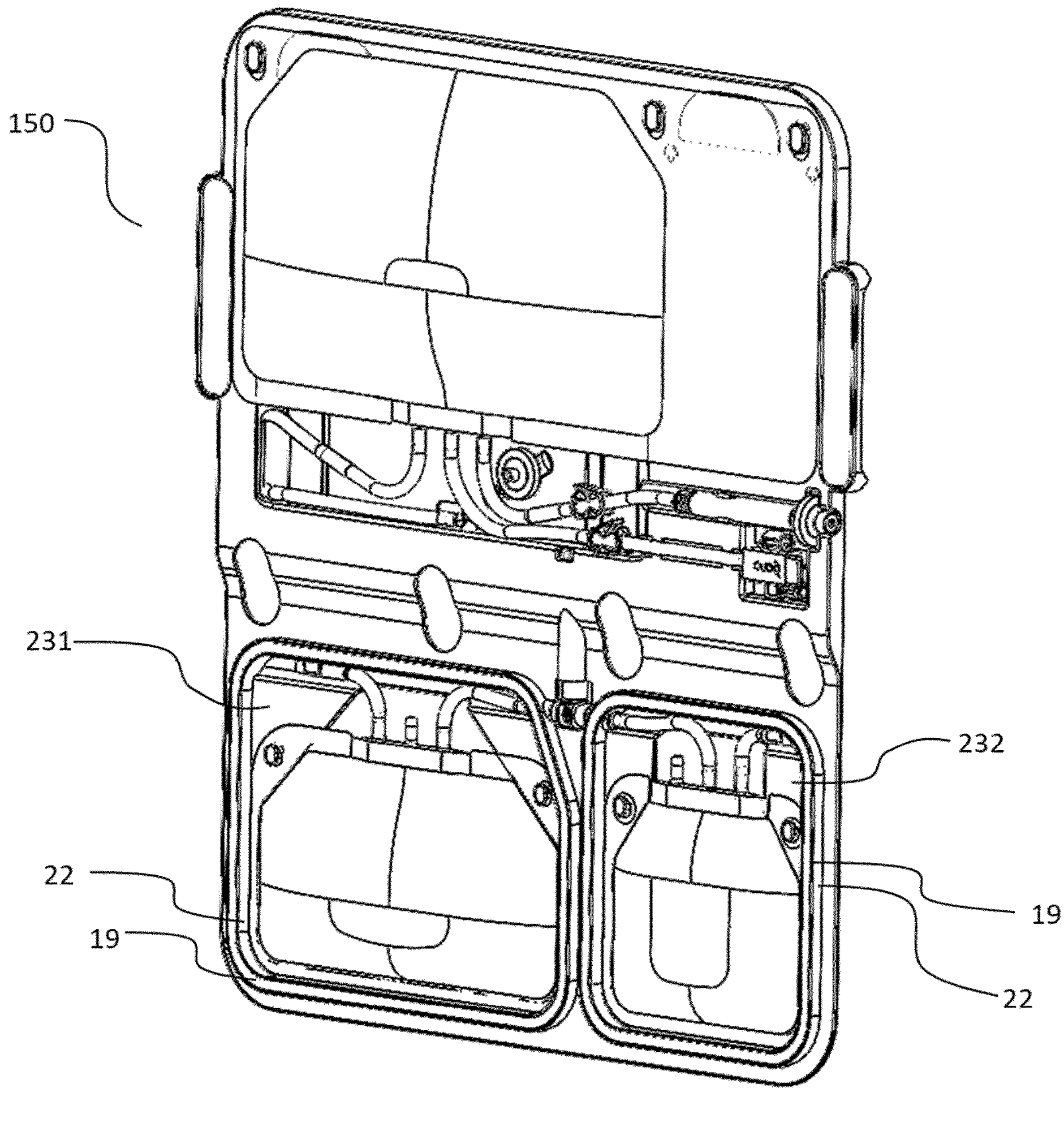
FIG. 19 depicts a perspective view of the front side of the frame (150) as shown in FIG. 15.

FIG. 19 depicts a perspective view of the front side of the frame (150) shown in FIG. 15. Here it can be seen how, in this non-limiting embodiment, the circumferential gaskets (19) that encircle the first and second sealable region (231, 232) of the frame (150) are provided on circumferential rims (22) that extend from the frame (150).

Figure 20:
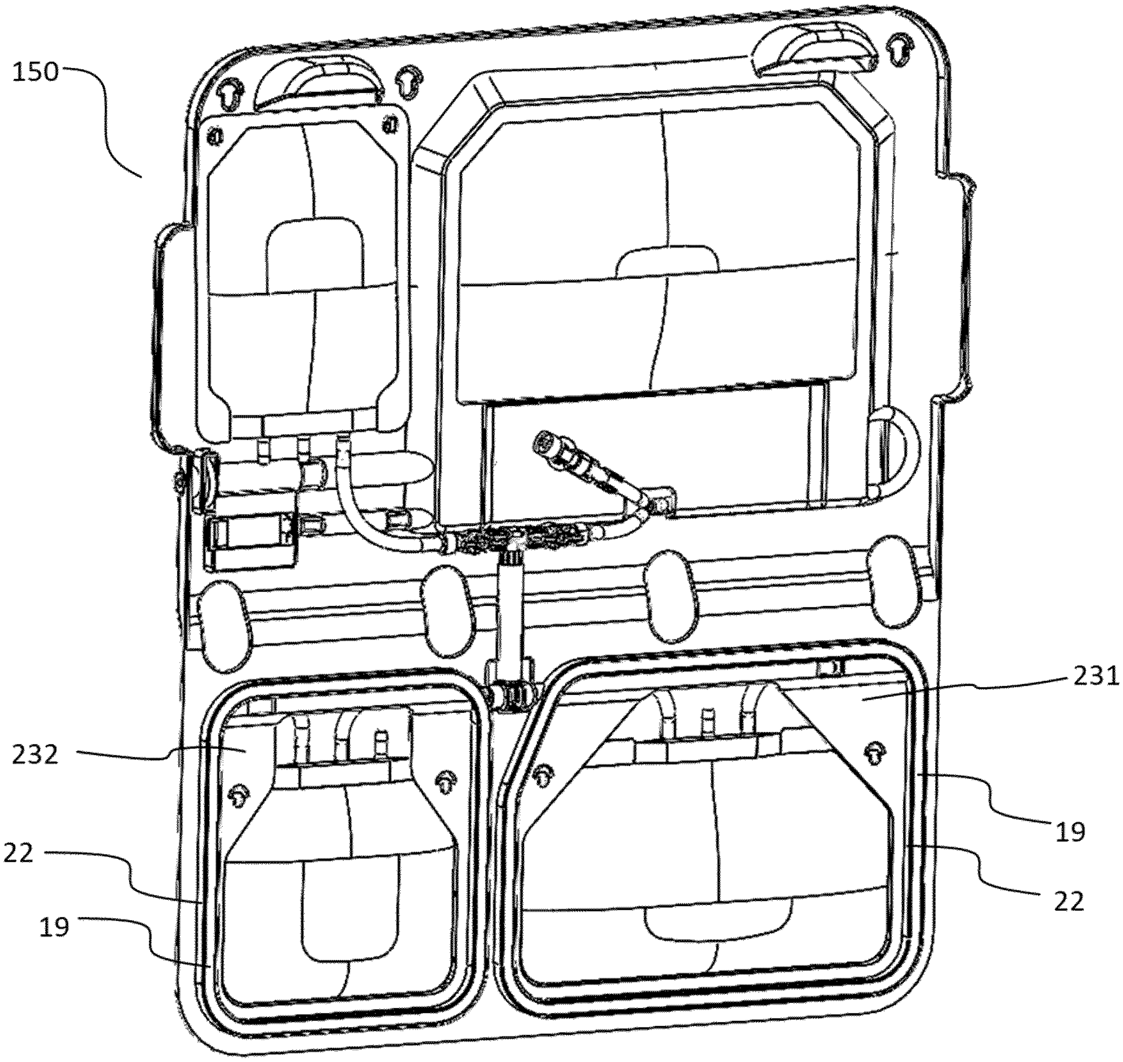
FIG. 20 depicts a perspective view of the back side of the frame (150) as shown in FIG. 19.

FIG. 20 depicts a perspective view of the back side of the frame (150) shown in FIG. 19. It shows that, in this non-limiting embodiment, also the back side of the frame (150) exhibits circumferential gaskets (19) that are provided on circumferential rims (22).

Figure 21:
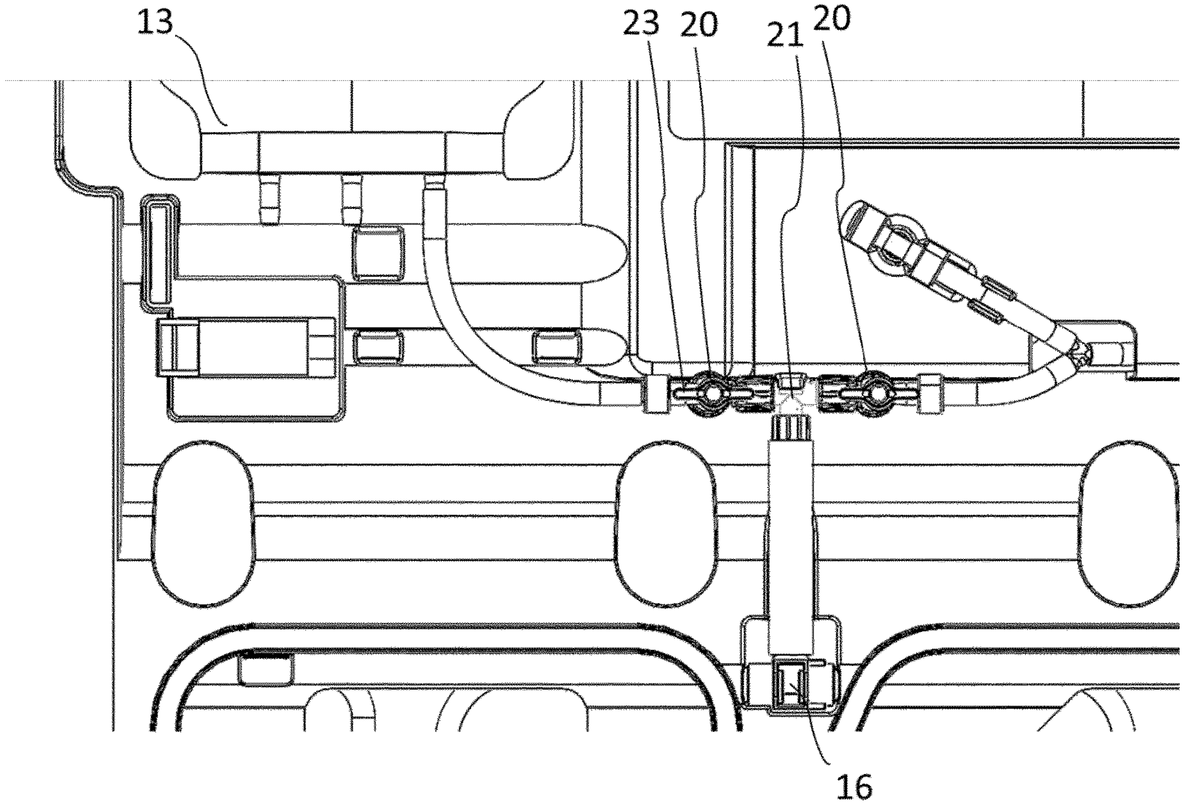
FIG. 21 depicts a detailed or expanded view of a part of the back side of the frame (150) as shown in FIG. 16.

FIG. 21 depicts a detailed frontal view of part of the back side of the frame (150) as shown in FIG. 16. The two outlets of the T-piece (21) arranged downstream of, and in a superior position with respect to the static mixing device (16) are connected with valves (20) capable of opening and closing the flow paths to the product container and the waste container (13), such as one-way stopcock valves. The valves (20) exhibit means (23) for mechanically operating the valves (20) oriented towards and adapted to be operated from a direction that corresponds to the back side of the frame (150). Such configuration allows the valves (20) to be operated by an automatic operator device arranged behind the frame (150), i.e. when viewed from the front side, for example when the frame (150) or kit is inserted in an apparatus adapted to operate the frame (150) or kit.

Figure 22:
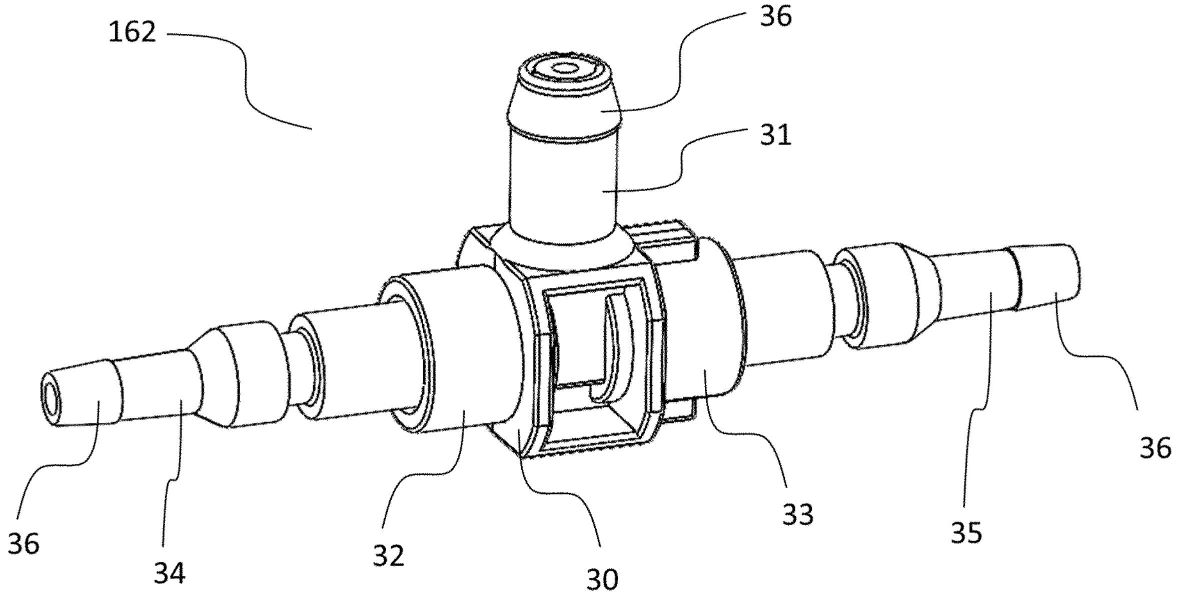
FIG. 22 depicts a perspective view of an exemplary static mixing device (162) as may be used in combination with a frame (150) or kit as shown, for example, in FIGS. 15 and 16.

FIG. 22 is a perspective view of an exemplary static mixing device (162) as may be used in combination with the frame (150) or kit shown e.g. in FIGS. 15 and 16. The static mixing device (162) may, according to some non-limiting embodiments, represent a jet impingement reactor. The mixing device (162) as shown includes a main housing (30) with an outlet port (31) and a first and second inlet port (32, 33). In this case, the static mixing device (162) is shown in its operating orientation in that the outlet port (31) points upward such that the third fluid exiting the outlet port (31) would flow in an anti-gravity direction. A first and second inlet connecting piece (34, 35) are fitted in the first and second inlet port (32, 33), respectively. Barbed connectors (36) are provided at the upstream ends of the inlet ports (32, 33) and at the downstream end of the outlet port (31).

Figure 23:
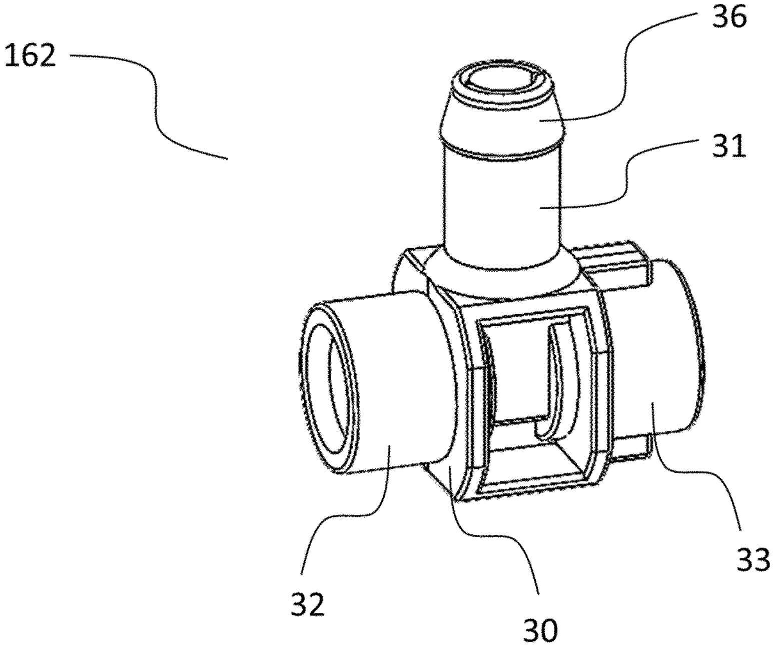
FIG. 23 depicts a perspective view of the static mixing device (162) as shown in FIG. 22.

FIG. 23 is a perspective view of the exemplary static mixing device (162) shown in FIG. 22. Here, the main housing (30) with the outlet port (31) and the first and second inlet port (32, 33) is shown without the first and second inlet connecting piece.

Figure 24:
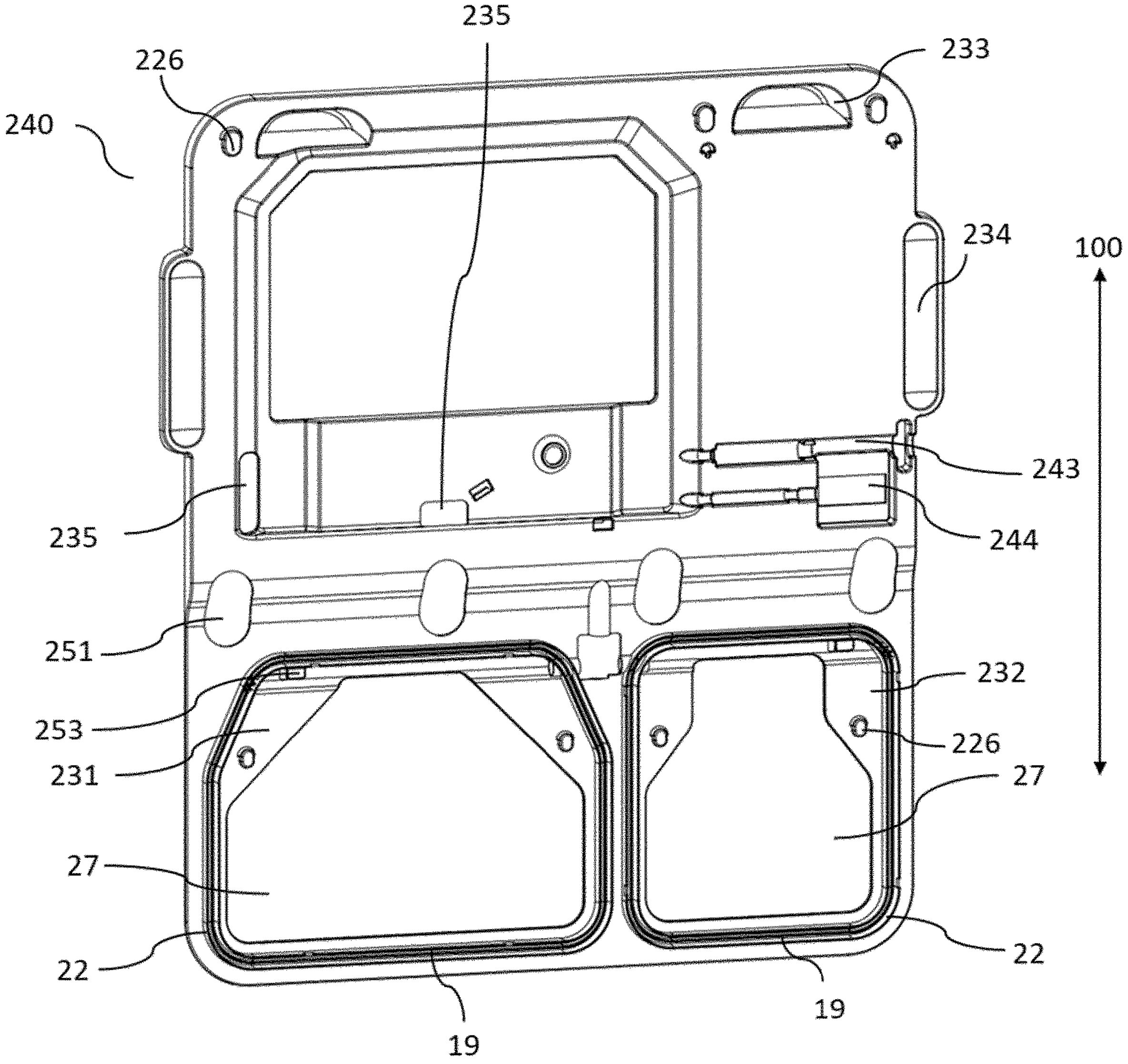
FIG. 24 depicts a perspective view of the front side of another example of a frame (240).

FIG. 24 is a perspective view of a front side, or user-facing side, of another example of a frame (240) according to the present disclosure, not drawn to scale. A flexible container, conduits, the static mixing device, or any other components as described herein defining the flow path of any of the first, second or third liquid, such as T- or Y-pieces, valves or filters, are absent in this depiction. In other words, it is a depiction of an exemplary frame (240) before it is assembled into a kit according to some non-limiting embodiments disclosed herein. The frame (240) is shown in its operating orientation, which is vertical, and parallel with a vertical axis (100). The frame (240) includes a first (231) and second (232) sealable region for holding a first and a second flexible substrate container (not shown). The sealable regions (231, 232) are defined by circumferential gaskets (19), which are provided by circumferential rims (22) extending from the frame. The sealable regions (231, 232) are positioned to be adjacent to one another. Even though not drawn to scale, it can be seen that the first sealable region (231) is larger than the second (232), and that the size difference is reflected in that the sealable regions (231, 232) have the same height, but the width of the first sealable region (231) is larger than that of the second sealable region (232). In this non-limiting embodiment, the shape of the first sealable region (231) is symmetrical with respect to the vertical axis, as is the second sealable region (232). Also shown are the through-holes (27) in the first and second sealable region (231, 232) through which a pressurized gas may be supplied in the operating state such as to exert pressure on external surfaces of the first and second flexible substrate bag. Also shown within the first and second sealable regions are means (226) for affixing flexible substrate containers.

Further depicted are depressions (243, 244) for holding a sampling tube, a sterile filter associated therewith, and an aseptic connector, respectively. The frame (240) further includes means (233) for affixing the frame to external holding means, such as hooks, or indentations e.g. to assist the user in correctly positioning the frame (240) to any corresponding holding means that may be provided, for example, by an apparatus for filling the flexible substrate containers when affixed to the frame (240) or an apparatus to operate the fully assembled frame (240) or kit. Grips or handles (234) are further provided such that a user can hold and position the frame (240) easily. Means (226) for affixing a product container to the frame (240) are also provided, e.g. in the current depicted non-limiting embodiment, in the upper region of the frame. Various small openings or through-holes (235) for holding conduits or allowing conduits to connect the front and the back side of the frame (240) are also depicted. Within the sealable regions (231, 232) of the frame, means (253) are provided for affixing or holding a conduit to the frame and within said sealable regions.

Specifically, one or more conduits associated with the container inlet port (for example, crimped tube endings) may be held and contained within said sealable region of the frame by such means, e.g. a hook. The frame (240) further includes four through-holes (251) in a central region that enable it to be affixed to an apparatus for operating the frame (240) or the kit.

Figure 25:
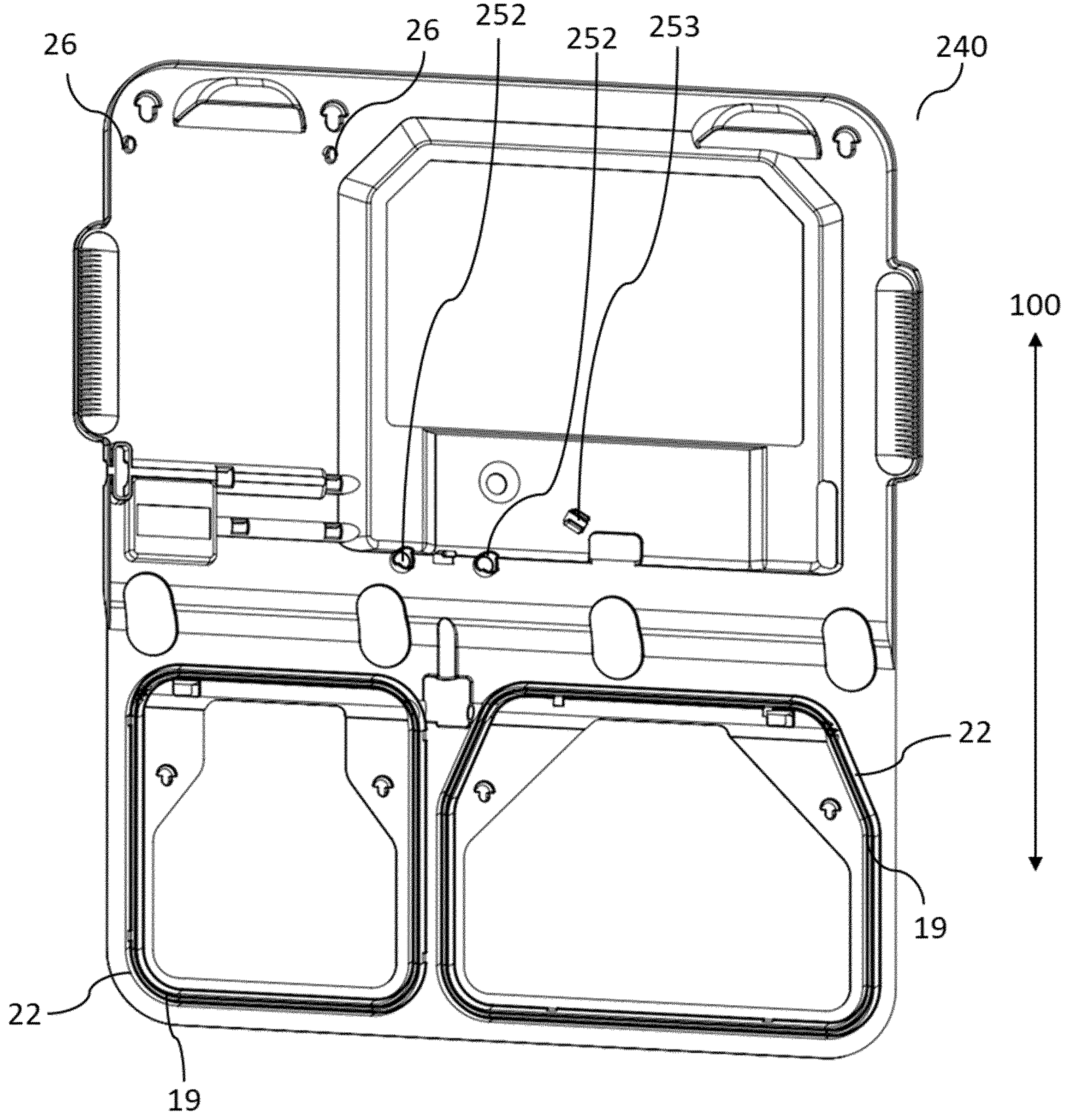
FIG. 25 depicts a perspective view of the back side of the frame (240) as depicted in FIG. 24.

FIG. 25 depicts a perspective view of the back side of the frame (240) as depicted in FIG. 24, in its vertical operating orientation, which is parallel with a vertical axis (100). As shown, the affixation or fastening means (26) for the flexible waste container are provided on the back side of the frame (240). The sealable regions (231, 232) with respect to back side of the frame (240) are also defined by circumferential gaskets (19) which are provided by circumferential rims (22) extending from the frame. The circumferential gaskets (19) that are provided for the back side of the frame (240) advantageously may be of the same shape and dimensions as the gaskets (19) used for the rims of the respective sealable regions on the front side of the frame (see FIG. 24). Two means for affixing a valve such as a valve (252) as shown in FIGS. 16 and 21 to the frame (240) are also depicted. Also further shown is a means (253) for affixing a conduit to the frame (240).

LIST OF REFERENCE NUMBERS

| | |
|---|---|
| 1 | flexible container |
| 2 | inlet/outlet port |
| 3 | sealable port |
| 4 | internal volume |
| 5 | flexible front wall |
| 6 | flexible back wall |
| 7 | sealed edge |
| 10, 50, 80, 120, 150, 240 | frame |
| 11, 51, 81, 121 | first flexible substrate container |
| 12, 52, 82, 122 | second flexible substrate container |
| 13, 53, 83, 123 | flexible waste container |

-continued

| LIST OF REFERENCE NUMBERS | |
|---|---|
| 14, 54, 84, 124 | flexible product container |
| 15, 55, 85, 125 | tray portion |
| 16, 162 | static mixing device |
| 17, 17a, 17b, 17c, 17d | conduit |
| 18 | means for holding a valve |
| 19 | circumferential gasket |
| 20 | valve |
| 21 | T-piece |
| 22 | circumferential rim |
| 23 | means for operating valve |
| 26 | affixation or fastening means |
| 27 | through-hole, e.g. in sealable region or cavity |
| 28 | means for holding the conduits |
| 29 | gas pressure distribution means |
| 30 | main housing of static mixing device |
| 31 | outlet port of static mixing device |
| 32 | first inlet port of static mixing device |
| 33 | second inlet port of static mixing device |
| 34 | first inlet connecting piece |
| 35 | second inlet connecting piece |
| 36 | barbed connectors |
| 91 | first or second flexible substrate container outlet port |
| 92 | first or second flexible substrate container sealed inlet port |
| 93 | flexible waste container inlet port |
| 94 | flexible product container inlet port |
| 95 | flexible product container resealable outlet port |
| 96 | static mixing device first inlet port |
| 97 | static mixing device second inlet port |
| 98 | static mixing device outlet port |
| 100 | vertical axis |
| 211, 551, 881 | first cavity for holding the first flexible substrate container |
| 212, 552, 882 | second cavity for holding the second flexible substrate container |
| 223, 523, 823 | means for holding the static mixing device |
| 224, 524, 824 | cavity for the flexible product container |
| 225, 525, 825 | cavity for the flexible waste container |
| 226 | means for affixing flexible substrate, product or waste container |
| 227 | sealed edge of flexible substrate, product or waste container |
| 228 | through-hole in peripheral zone of flexible container |
| 231 | first sealable region for holding the first flexible substrate container |
| 232 | second sealable region for holding the second flexible substrate container |
| 233 | means for affixing frame to external holding means |
| 234 | handle |
| 235 | through-hole |
| 241 | sampling tube |
| 242 | sterile filter |
| 243 | depression for holding sampling tube and sterile filter |
| 244 | depression for holding aseptic connector |
| 245 | aseptic connector |
| 246 | pinch valve |
| 247 | aseptic disconnector |
| 248 | Y-piece |
| 249 | sterile filter |
| 251 | through-hole for matching hook to hold frame in position |
| 252 | means for affixing a valve |
| 253 | means for holding or affixing a conduit to the frame |

The following list of numbered items are further non-limiting embodiments comprised in the present disclosure:

1. A frame for simultaneously holding:
   (a) a first and a second flexible substrate container each including an outlet port,
   (b) a flexible waste container including an inlet port,
   (c) a flexible product container including an inlet port,
   (d) a static mixing device including at least a first and a second inlet port and an outlet port, and
   (e) conduits for fluidically connecting the outlet port of the first substrate container with the first inlet port of the static mixing device, the outlet port of the second substrate container with the second inlet port of the static mixing device, and the outlet port of the static mixing device with the inlet ports of the waste container and the product container;

wherein the frame includes a tray portion including
   a first cavity for holding the first flexible substrate container,
   a second cavity for holding the second flexible substrate container, and
   a means for holding the static mixing device;

wherein the frame has an operating orientation, and wherein the first and the second cavity and the means for holding the static mixing device are arranged such that a flow of fluid from the first and the second substrate container to the static mixing device and/or from the static mixing device to the waste or product container in the operating orientation occurs at least partially in an anti-gravity direction.

2. The frame of item 1, wherein the tray portion includes a further cavity for the flexible product container and a further cavity for holding the flexible waste container.
3. The frame of item 1 or 2, wherein the each of the first and the second cavity includes one or more means for affixing the respective flexible substrate container, said means being optionally shaped as protrusions or pins, for receiving a flexible substrate container having through-holes which are positioned to match the pins or protrusions, and wherein the pins are optionally barbed pins or snap-lock pins.
4. The frame of any one of the preceding items, further including an identification tag, such as an RFID tag.
5. The frame of any one of the preceding items, wherein the means for holding the static mixing device is adapted such as to hold the static mixing device only when said static mixing device has a desired orientation, wherein a flow of liquid out of the static mixing device through its outlet port occurs optionally in an anti-gravity direction when the static mixing device has its desired orientation and the frame is in its operating orientation.
6. The frame of any one of the preceding items, wherein the first and the second cavity and the means for holding the static mixing device are arranged such that, in the operating orientation of the frame, the outlet ports of the flexible substrate containers have an inferior position relative to the position of the respective inlet ports of the static mixing device.
7. The frame of any one of the preceding items, wherein the tray portion includes
   a first through-hole arranged in the first cavity and a second through-hole arranged in the second cavity, and/or
   a circumferential gasket for each of the first and the second cavity.
8. The frame of any one of the preceding items, wherein the first cavity is shaped to at least partially accommodate the conduit for fluidically connecting the outlet port of the first substrate container with the first inlet port of the static mixing device, or wherein second cavity is shaped to at least partially accommodate the conduit for fluidically connecting the outlet port of the second substrate container with the second inlet port of the static mixing device.
9. The frame of any one of the preceding items, wherein the frame is adapted to be insertable in its operating orientation into an apparatus for aseptically mixing two fluids, wherein the apparatus includes
   a counter piece for sealingly covering the first and the second cavity, and
   means for exerting pressure on the first and the second flexible substrate container when inserted in the first and the second cavity;
   and wherein the frame optionally holds the first and second substrate container, the flexible waste container, the flexible product container, the static mixing device and the conduits for fluidically connecting the outlet port of the first substrate container with the first inlet port of the static mixing device, the outlet port of the second substrate container with the second inlet port of the static mixing device, and the outlet port of the static mixing device with the inlet ports of the waste container and the product container.

10. A kit including the frame of any one of items 1 to 9 and:
    (a) the first and the second flexible substrate container,
    (b) the flexible waste container,
    (c) the flexible product container,
    (d) the static mixing device, and
    (e) conduits for fluidically connecting the outlet port of the first substrate container with the first inlet port of the static mixing device, the outlet port of the second substrate container with the second inlet port of the static mixing device, and the outlet port of the static mixing device with the inlet ports of the flexible waste container and the flexible product container, and wherein, optionally, each of the first and second flexible substrate containers are filled with liquid substrates.
11. The kit of item 10, wherein the static mixing device includes a T-piece mixer, a Y-piece mixer, a vortex mixer, a baffle-based static mixer, a microfluidic mixing device, a multi-inlet vortex mixer (MIVM), or a jet impingement reactor, and wherein the jet impingement reactor optionally includes:
    a reaction chamber defined by an interior surface of a reaction chamber wall, the reaction chamber having a substantially spheroidal overall shape, said chamber including:
    (a) a first and a second fluid inlet, wherein the first and the second fluid inlet are arranged at opposite positions on a first central axis (x) of the reaction chamber such as to point at one another, and wherein each of the first and the second fluid inlet includes a nozzle; and
    (b) a fluid outlet arranged at a third position, said third position being located on a second central axis of said chamber, the second central axis being perpendicular to the first central axis;
    wherein the distance (d) between the nozzle of the first fluid inlet and the nozzle of the second fluid inlet is the same or smaller than the diameter of the reaction chamber along the first central axis.
12. A flexible container useful as a flexible substrate container, a flexible waste container or a flexible product container as specified in any one of the preceding items, having an internal space for holding a fluid material surrounded by a flexible front wall and a flexible back wall, each wall being made of a polymeric material, and at least one inlet or outlet port for enabling fluid communication with the internal space, wherein the flexible front wall and the flexible back wall are connected to one another such as to form a sealed edge substantially surrounding the internal space, wherein the edge includes four corner regions such that the internal space when empty has a square or rectangular overall shape, and wherein a first through-hole is provided in or near a first corner region and a second through-hole is provided in or near a second corner region of the sealed edge, wherein the second corner region is adjacent to the first corner region.
13. An apparatus including a housing adapted for receiving the frame of item 9 in its operating orientation, wherein the first and the second flexible substrate containers are empty, and means for aseptically filing the first and second substrate into the first and the second flexible substrate container.
14. An apparatus including a housing adapted for receiving the frame of item 9 in its operating orientation, wherein the first and the second flexible substrate containers contain the first and the second substrate, and means for forcing the substrates to flow from the first and the second flexible substrate container into the static mixing device such as to mix and form a liquid product, wherein said means optionally includes a pressurized gas.

15. A method for mixing two fluid substrates, the method including the use of the frame of any one of items 1 to 9, the kit of item 10 or 11, the flexible container of item 12, or the apparatus of item 13 or 14.

What is claimed is:

1. A frame configured for interfacing with an apparatus for aseptically mixing fluids, the frame comprising:

a first sealable region configured to hold a first flexible substrate container, the first sealable region comprising a first connector configured to reversibly fix the first flexible substrate container in the first sealable region;

a second sealable region configured to hold a second flexible substrate container, the second sealable region comprising a second connector configured to reversibly fix the second flexible substrate container in the second sealable region and a static mixing device holder configured to hold a static mixing device;

wherein the frame has an operating orientation, and wherein the first and the second sealable region and the static mixing device holder are arranged with fluid flow configured to flow from the first and the second flexible substrate container to the static mixing device in the operating orientation occurring at least partially in an anti-gravity direction, wherein the first connector and the second connector are arranged at a user-facing side of the frame;

wherein the static mixing device holder is configured to hold the static mixing device only when the static mixing device is arranged in a predetermined orientation;

and wherein when the static mixing device is arranged in the predetermined orientation and the frame is arranged in the operating orientation, a flow of liquid out of the static mixing device occurs in an anti-gravity direction.

2. The frame of claim 1, wherein the first and/or the second sealable region is defined by a perimeter rim protruding from the frame.

3. The frame of claim 2, wherein the perimeter rim is configured to form a seal with a counterpiece that comprises a cavity configured to receive the first and/or second flexible substrate container.

4. The frame of claim 1, wherein the first and the second sealable region are substantially similar or identical in height and different in width.

5. The frame of claim 1, wherein the frame has a vertical operating orientation.

6. The frame of claim 1, wherein the first and second connector are one or more hooks, protrusions, or pins that are configured to receive respectively, the first and second flexible substrate container in through-holes thereof, which are positioned to align with the hooks, pins, or protrusions.

7. The frame of claim 6, wherein the pins are barbed pins or snap-lock pins.

8. The frame of claim 1, wherein the first sealable region and the second sealable region are located adjacent to one another, and wherein a smallest distance between the first sealable region and the second sealable region is less than 10% of a width of the first sealable region.

9. The frame of claim 1, wherein the first and the second sealable region and the static mixing device holder are arranged so that, in the operating orientation of the frame, a respective outlet port of the first and second flexible substrate containers have a lower position relative to a position of a corresponding inlet port of the static mixing device.

10. The frame of claim 1, wherein the frame comprises a first through-hole in the first sealable region and a second through-hole in the second sealable region.

11. The frame of claim 1, wherein the frame comprises a perimeter gasket for each of the first and the second sealable region.

12. The frame of claim 1, wherein the frame further comprises:

a flexible waste container holder configured to hold a flexible waste container;

a flexible product container holder configured to hold a flexible product container; and a conduit holder configured to hold a plurality of conduits configured to fluidically connect the first and second flexible substrate container, the flexible waste container, the flexible product container, and the static mixing device, wherein, in the operating orientation, the static mixing device holder, the flexible waste container holder, and the flexible product container holder are arranged with fluid flow configured to flow from the static mixing device to the flexible waste container or the flexible product container at least partially in an anti-gravity direction.

13. The frame of claim 12, wherein the frame comprises a third connector configured to reversibly fix the flexible product container and/or a fourth connector configured to reversibly fix the flexible waste container.

14. The frame of claim 13, wherein the frame has a back side that is opposite to the user-facing side, and wherein the flexible product container holder is arranged at the user-facing side of the frame and the flexible waste container holder is arranged at the user-facing side or at the back side of the frame.

15. The frame of claim 12, wherein the first sealable region is shaped to at least partially accommodate a conduit of the plurality of conduits, or wherein the second sealable region is shaped to at least partially accommodate a conduit of the plurality of conduits.

16. The frame of claim 15, further comprising a Y- or T-piece holder configured to hold a Y- or T-piece fluidically connected with the plurality of conduits and located between the static mixing device and the waste container and the product container.

* * * * *